(12) United States Patent
Yun et al.

(10) Patent No.: US 10,249,409 B2
(45) Date of Patent: Apr. 2, 2019

(54) COATED CONDUCTORS

(71) Applicant: Schlumberger Technology Corporation, Sugar Land, TX (US)

(72) Inventors: Jushik Yun, Sugar Land, TX (US); Manuel Marya, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/188,548

(22) Filed: Jun. 21, 2016

(65) Prior Publication Data

US 2017/0365377 A1 Dec. 21, 2017

(51) Int. Cl.
*H01B 1/02* (2006.01)
*H01B 3/00* (2006.01)
(Continued)

(52) U.S. Cl.
CPC .......... *H01B 7/2825* (2013.01); *H01B 1/026* (2013.01); *H01B 3/004* (2013.01); *H01B 3/306* (2013.01); *H01B 7/2806* (2013.01); *H01B 13/165* (2013.01); *H01B 13/22* (2013.01); *H01B 13/245* (2013.01); *H01B 13/26* (2013.01); *H02K 11/33* (2016.01); *E21B 43/128* (2013.01); *E21B 47/00* (2013.01); *E21B 47/0007* (2013.01)

(58) Field of Classification Search
CPC .... E21B 43/128; E21B 47/00; E21B 47/0007; H01B 1/026; H01B 3/004; H01B 3/306; H01B 7/2806; H01B 7/2825; H01B 13/22; H01B 13/26; H01B 13/165; H01B 13/245; H01B 1/02; H01B 3/00; H01B 3/30; H01B 7/28; H01B 13/16; H01B 13/24; H02K 3/30; H02K 11/33; H02K 15/12
USPC ............................................ 174/520; 310/43
See application file for complete search history.

(56) References Cited

U.S. PATENT DOCUMENTS

| | | | | |
|---|---|---|---|---|
| 2,802,897 A | * | 8/1957 | Boldebuck | H01B 7/2806 101/401.1 |
| 6,268,672 B1 | * | 7/2001 | Straub | E21B 43/128 166/105 |

(Continued)

FOREIGN PATENT DOCUMENTS

WO 2014145834 A1 9/2014

OTHER PUBLICATIONS

The permeability of hydrogen in various metals, 2011 http://www.rebresearch.com/H2perm2.htm) (3 pages).
(Continued)

*Primary Examiner* — Timothy J Thompson
*Assistant Examiner* — Guillermo J Egoavil

(57) ABSTRACT

An assembly can include a housing that includes opposing ends, a longitudinal axis, an axial length defined between the opposing ends, a maximum transverse dimension that is less than the length and an interior space; circuitry disposed at least in part in the interior space; and a coated electrical conductor electrically coupled to the circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer.

14 Claims, 24 Drawing Sheets

(51) Int. Cl.
*H01B 3/30* (2006.01)
*H01B 7/28* (2006.01)
*H01B 13/16* (2006.01)
*H01B 13/22* (2006.01)
*H01B 13/24* (2006.01)
*H01B 13/26* (2006.01)
*H01B 7/282* (2006.01)
*H02K 11/33* (2016.01)
*E21B 47/00* (2012.01)
*E21B 43/12* (2006.01)

(56) References Cited

U.S. PATENT DOCUMENTS

| | | | |
|---|---|---|---|
| 7,071,588 B1* | 7/2006 | Khazanov | H01R 13/523 |
| | | | 310/71 |
| 7,714,231 B2 | 5/2010 | Varkey et al. | |
| 8,049,333 B2* | 11/2011 | Alden | B82Y 30/00 |
| | | | 257/741 |
| 8,633,289 B2 | 1/2014 | Carver et al. | |
| 2005/0184624 A1* | 8/2005 | Hasegawa | A61B 8/12 |
| | | | 310/334 |
| 2009/0317264 A1 | 12/2009 | Manke et al. | |
| 2012/0063931 A1 | 3/2012 | Rumbaugh et al. | |
| 2014/0042835 A1* | 2/2014 | Holzmueller | H02K 5/124 |
| | | | 310/43 |
| 2014/0154113 A1 | 6/2014 | Yin et al. | |
| 2014/0159536 A1 | 6/2014 | Flett | |
| 2014/0213742 A1 | 7/2014 | Drake et al. | |
| 2014/0284850 A1 | 9/2014 | Drake et al. | |
| 2014/0316079 A1 | 10/2014 | Drake et al. | |
| 2016/0293294 A1* | 10/2016 | Matlack | E21B 47/12 |

OTHER PUBLICATIONS

Campbell, Temperature Dependence of Hydrolysis of Polyimide Wire Insulation, NRL Memorandum Report 5158, Aug. 4, 1983 (26 pages).
DuPont, Kapton® Polyimide Films, 2000 (26 pages).
Schlumberger, PPC Powered positioning caliper, 2010 (2 pages).
Technology of Vacuum Metallized Plastics Packaging, Feb. 13, 2006 (http://www.plasticstrends.net/index.php/last-months-mainmenu-28/21-technology-of-vacuum-metallized-plastics-packaging) (6 pages).
Bao, L., Effect of temperature on moisture absorption of a bismaleimide resin and its carbon fiber composites. Polymer, 43(2002), 3987, Abstract (2 pages).

* cited by examiner

COATED CONDUCTORS

BACKGROUND

A conductor can conduct electricity or, for example, electromagnetic energy (e.g., consider an optical fiber). A conductor can be coated with a material that acts to insulate the conductor. As an example, such a material may be a dielectric material, which may be, for example, a polymeric material.

SUMMARY

An assembly can include a housing that includes opposing ends, a longitudinal axis, an axial length defined between the opposing ends, a maximum transverse dimension that is less than the length and an interior space; circuitry disposed at least in part in the interior space; and a coated electrical conductor electrically coupled to the circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer. A method can include depositing a polymeric electrical insulation layer about a length of an electrical conductor that includes copper; depositing a barrier layer about at least a portion of the polymeric electrical insulation layer to form at least a portion of a coated electrical conductor; and forming a submersible component that includes at least a portion of the coated electrical conductor. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
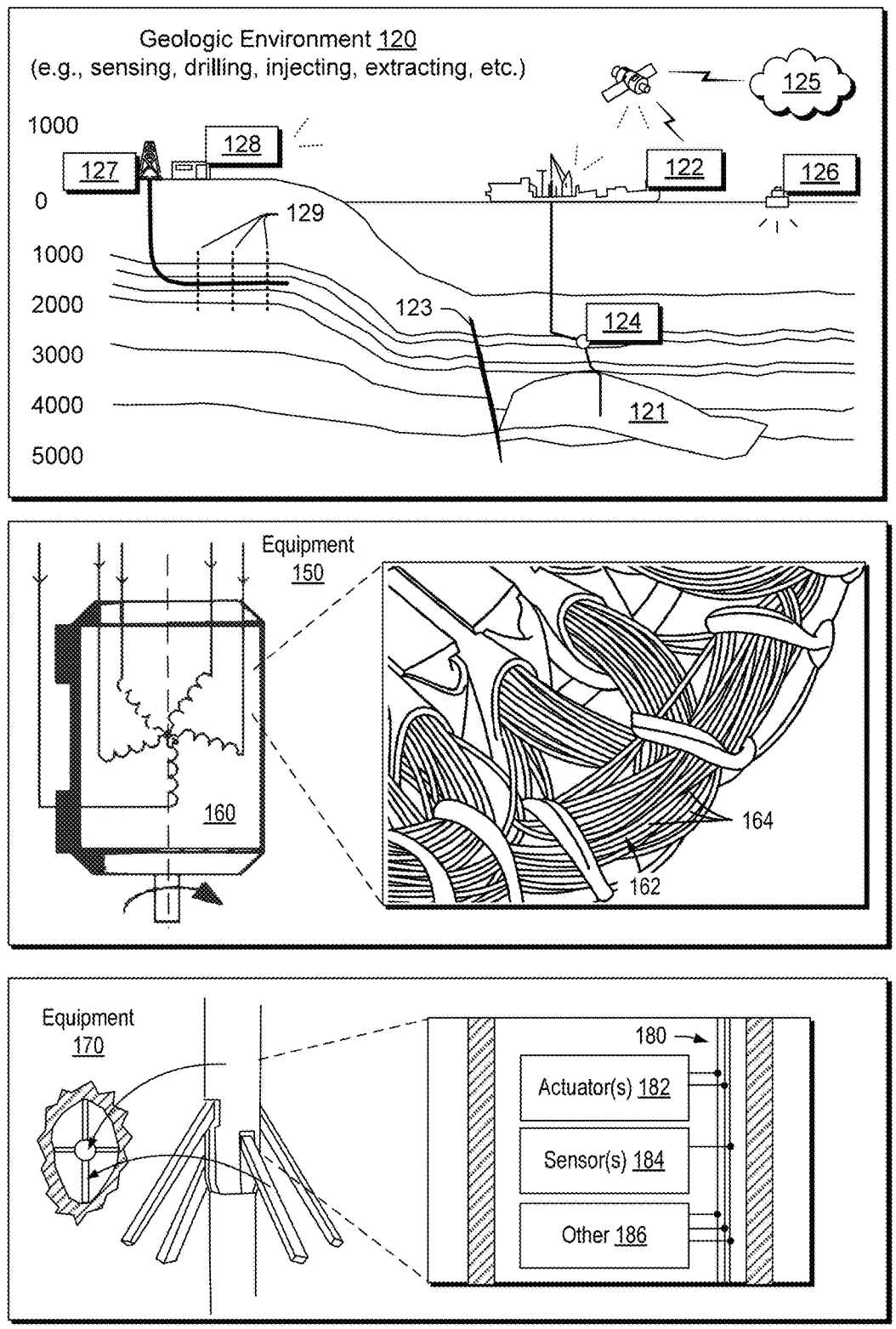
FIG. 1 illustrates examples of equipment in geologic environments.

FIG. 1 shows an example of a geologic environment 120 and examples of equipment 150 and 170. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, etc.

As to the equipment 150, an electric motor 160 can include bundles 162 of wires 164. For example, the wires 164 can be magnet wires. Magnet wire can include electrically conductive material such as an electrically conductive metal or alloy material. For example, consider copper or aluminum as electrically conductive material. As an example, magnet wire can be insulated with a layer or layers of insulation or insulations. As an example, magnet wire may be used to construct various types of equipment such as, for example, transformers, inductors, motors, speakers, hard disk head actuators, electromagnets, and other applications that can include coils of insulated wire.

As an example, magnet wire may have a round cross section, a rectangular cross section, a hexagonal cross section (e.g., with rounded corners) or one or more types of cross sections, which may provide for one or more of packing efficiency, structural stability, thermal conductivity, etc.

As shown in the example of FIG. 1, the electric motor 160 may be a multiphase electric motor (e.g., a polyphase electric motor). For example, polyphase power may be delivered via one or more power cables to drive an induction motor where the polyphaser power generates a rotating magnetic field. As an example, where a three-or-more-phase supply completes one full cycle, a magnetic field of a two-poles-per-phase motor can be rotated through 360 degrees in physical space. As an example, a motor may be a single-phase motor. As an example, a motor may be an AC motor. As an example, a motor may be a DC motor.

As to the equipment 170, it can include one or more conductors 180 that may be operatively coupled to one or more actuators 182, one or more sensors 184 and/or one or more other types of electrical components 186 (e.g., electrical, electro-mechanical, electro-chemical, electro-fluidic, etc.).

As an example, equipment can include wireline equipment. For example, consider equipment that is operatively coupled to an electrical cable that can lower the equipment into a borehole where the equipment may also include transmission circuitry that can transmit and/or receive information via the electrical cable.

As an example, a wireline operation can include using single-strand and/or multi-strand wire or cable for intervention in a borehole (e.g., consider oil and/or gas wells). As an example, a wireline operation can include electric logging via one or more cables that include electrical conductors.

As an example, the equipment 150 may be or include artificial lift equipment. For example, the electric motor 160 may be an electric motor of an electric submersible pump (e.g., an ESP). In such an example, a cable or cables may extend from surface equipment to the equipment 150, for example, to provide power, to carry information, to sense information, etc.

As an example, equipment can include an electric downhole motor, an electric downhole wireline tool (e.g., or slickline tool), a cable, etc.

Conditions in a geologic environment may be transient and/or persistent. Where equipment is placed within a geologic environment, longevity of the equipment can depend on characteristics of the environment and, for example, duration of use of the equipment as well as function of the equipment. Where equipment is to endure in an environment over an extended period of time, uncertainty may arise in one or more factors that could impact integrity or expected lifetime of the equipment. As an example, where a period of time may be of the order of decades, equipment that is intended to last for such a period of time may be constructed to endure conditions imposed thereon, whether imposed by an environment or environments and/or one or more functions of the equipment itself.

As an example, an environment may be a harsh environment, for example, an environment that may be classified as being a high-pressure and high-temperature environment (HPHT). A so-called HPHT environment may include pressures up to about 138 MPa (e.g., about 20,000 psi) and temperatures up to about 205 degrees C. (e.g., about 400 degrees F. and about 480 K), a so-called ultra-HPHT environment may include pressures up to about 241 MPa (e.g., about 35,000 psi) and temperatures up to about 260 degrees C. (e.g., about 500 degrees F. and about 530 K) and a so-called HPHT-hc environment may include pressures greater than about 241 MPa (e.g., about 35,000 psi) and temperatures greater than about 260 degrees C. (e.g., about 500 degrees F. and about 530 K). As an example, an environment may be classified based in one of the aforementioned classes based on pressure or temperature alone. As an example, an environment may have its pressure and/or temperature elevated, for example, through use of equipment, techniques, etc. For example, a SAGD operation may elevate temperature of an environment (e.g., by 100 degrees C. or more; about 370 K or more).

As mentioned, magnet wire may be part of equipment and/or operatively coupled to equipment. As to motorized equipment, various examples of electric submersible pump (ESP) equipment are described; noting that magnet wire or other relatively small gauge wire can be utilized in and/or in association with one or more types of equipment.

Figure 2:
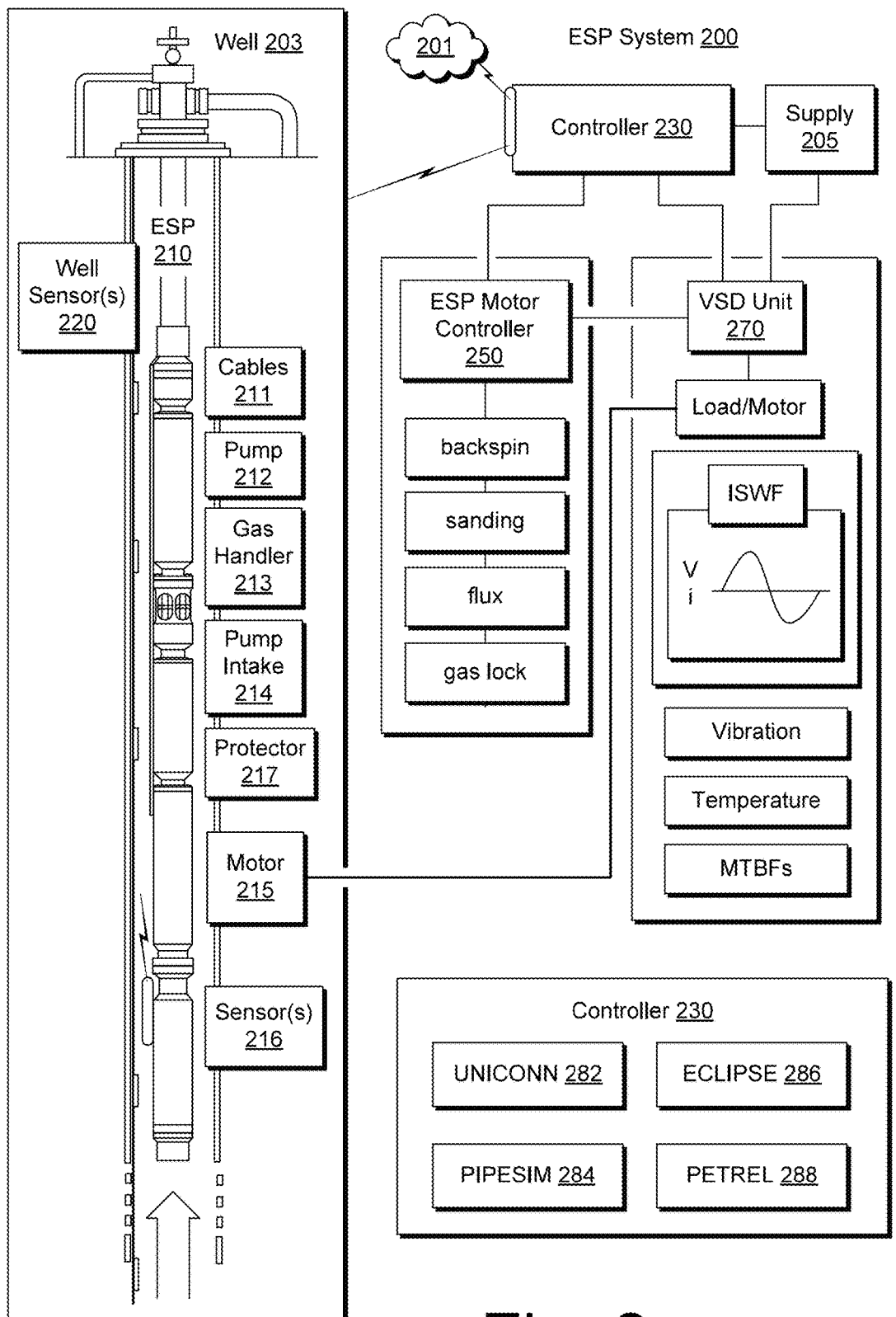
FIG. 2 illustrates an example of an electric submersible pump system.

FIG. 2 shows an example of an ESP system 200 that includes an ESP 210 as an example of equipment that may be placed in a geologic environment. As an example, an ESP may be expected to function in an environment over an extended period of time (e.g., optionally of the order of years).

In the example of FIG. 2, the ESP system 200 includes a network 201, a well 203 disposed in a geologic environment (e.g., with surface equipment, etc.), a power supply 205, the ESP 210, a controller 230, a motor controller 250 and a VSD unit 270. The power supply 205 may receive power from a power grid, an onsite generator (e.g., natural gas driven turbine), or other source. The power supply 205 may supply a voltage, for example, of about 4.16 kV.

As shown, the well 203 includes a wellhead that can include a choke (e.g., a choke valve). For example, the well 203 can include a choke valve to control various operations such as to reduce pressure of a fluid from high pressure in a closed wellbore to atmospheric pressure. A wellhead may include one or more sensors such as a temperature sensor, a pressure sensor, a solids sensor, etc.

As to the ESP 210, it is shown as including cables 211 (e.g., or a cable), a pump 212, gas handling features 213, a pump intake 214, a motor 215, one or more sensors 216 (e.g., temperature, pressure, strain, current leakage, vibration, etc.) and a protector 217.

As an example, an ESP may include a REDA™ HOTLINE™ high-temperature ESP motor. Such a motor may be suitable for implementation in a thermal recovery heavy oil production system, such as, for example, SAGD system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation.

As an example, the one or more sensors 216 of the ESP 210 may be part of a digital downhole monitoring system. For example, consider the commercially available PHOENIX™ MULTISENSOR XT150 system marketed by Schlumberger Limited (Houston, Tex.). A monitoring system may include a base unit that operatively couples to an ESP motor (see, e.g., the motor 215), for example, directly, via a motor-base crossover, etc. As an example, such a base unit (e.g., base gauge) may measure intake pressure, intake temperature, motor oil temperature, motor winding temperature, vibration, currently leakage, etc. As explained with respect to FIG. 4, a base unit may transmit information via a power cable that provides power to an ESP motor and may receive power via such a cable as well.

As an example, a remote unit may be provided that may be located at a pump discharge (e.g., located at an end opposite the pump intake 214). As an example, a base unit and a remote unit may, in combination, measure intake and discharge pressures across a pump (see, e.g., the pump 212), for example, for analysis of a pump curve. As an example, alarms may be set for one or more parameters (e.g., measurements, parameters based on measurements, etc.).

Where a system includes a base unit and a remote unit, such as those of the PHOENIX™ MULTISENSOR XT150 system, the units may be linked via wires. Such an arrangement provide power from the base unit to the remote unit and allows for communication between the base unit and the remote unit (e.g., at least transmission of information from the remote unit to the base unit). As an example, a remote unit is powered via a wired interface to a base unit such that one or more sensors of the remote unit can sense physical phenomena. In such an example, the remote unit can then transmit sensed information to the base unit, which, in turn, may transmit such information to a surface unit via a power cable configured to provide power to an ESP motor.

In the example of FIG. 2, the well 203 may include one or more well sensors 220, for example, such as the commercially available OPTICLINE™ sensors or WELLWATCHER BRITEBLUE™ sensors marketed by Schlumberger Limited (Houston, Tex.). Such sensors are fiber-optic based and can provide for real time sensing of temperature, for example, in SAGD or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP. Well sensors may extend a considerable distance into a well and possibly beyond a position of an ESP.

In the example of FIG. 2, the controller 230 can include one or more interfaces, for example, for receipt, transmission or receipt and transmission of information with the motor controller 250, a VSD unit 270, the power supply 205 (e.g., a gas fueled turbine generator, a power company, etc.), the network 201, equipment in the well 203, equipment in another well, etc.

As shown in FIG. 2, the controller 230 may include or provide access to one or more modules or frameworks. Further, the controller 230 may include features of an ESP motor controller and optionally supplant the ESP motor controller 250. For example, the controller 230 may include the UNICONN™ motor controller 282 marketed by Schlumberger Limited (Houston, Tex.). In the example of FIG. 2, the controller 230 may access one or more of the PIPESIM™ framework 284, the ECLIPSE™ framework 286 marketed by Schlumberger Limited (Houston, Tex.) and the PETREL™ framework 288 marketed by Schlumberger Limited (Houston, Tex.) (e.g., and optionally the OCEAN™ framework marketed by Schlumberger Limited (Houston, Tex.)).

In the example of FIG. 2, the motor controller 250 may be a commercially available motor controller such as the UNICONN™ motor controller. The UNICONN™ motor controller can connect to a SCADA system, the ESPWATCHER™ surveillance system, etc. The UNICONN™ motor controller can perform some control and data acquisition tasks for ESPs, surface pumps or other monitored wells. As an example, the UNICONN™ motor controller can interface with the aforementioned PHOENIX™ monitoring system, for example, to access pressure, temperature and vibration data and various protection parameters as well as to provide direct current power to downhole sensors. The UNICONN™ motor controller can interface with fixed speed drive (FSD) controllers or a VSD unit, for example, such as the VSD unit 270.

For FSD controllers, the UNICONN™ motor controller can monitor ESP system three-phase currents, three-phase surface voltage, supply voltage and frequency, ESP spinning frequency and leg ground, power factor and motor load.

For VSD units, the UNICONN™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

In the example of FIG. 2, the ESP motor controller 250 includes various modules to handle, for example, backspin of an ESP, sanding of an ESP, flux of an ESP and gas lock of an ESP. The motor controller 250 may include any of a variety of features, additionally, alternatively, etc.

In the example of FIG. 2, the VSD unit 270 may be a low voltage drive (LVD) unit, a medium voltage drive (MVD) unit or other type of unit (e.g., a high voltage drive, which may provide a voltage in excess of about 4.16 kV). As an example, the VSD unit 270 may receive power with a voltage of about 4.16 kV and control a motor as a load with a voltage from about 0 V to about 4.16 kV. The VSD unit 270 may include commercially available control circuitry such as the SPEEDSTAR™ MVD control circuitry marketed by Schlumberger Limited (Houston, Tex.).

Figure 3:
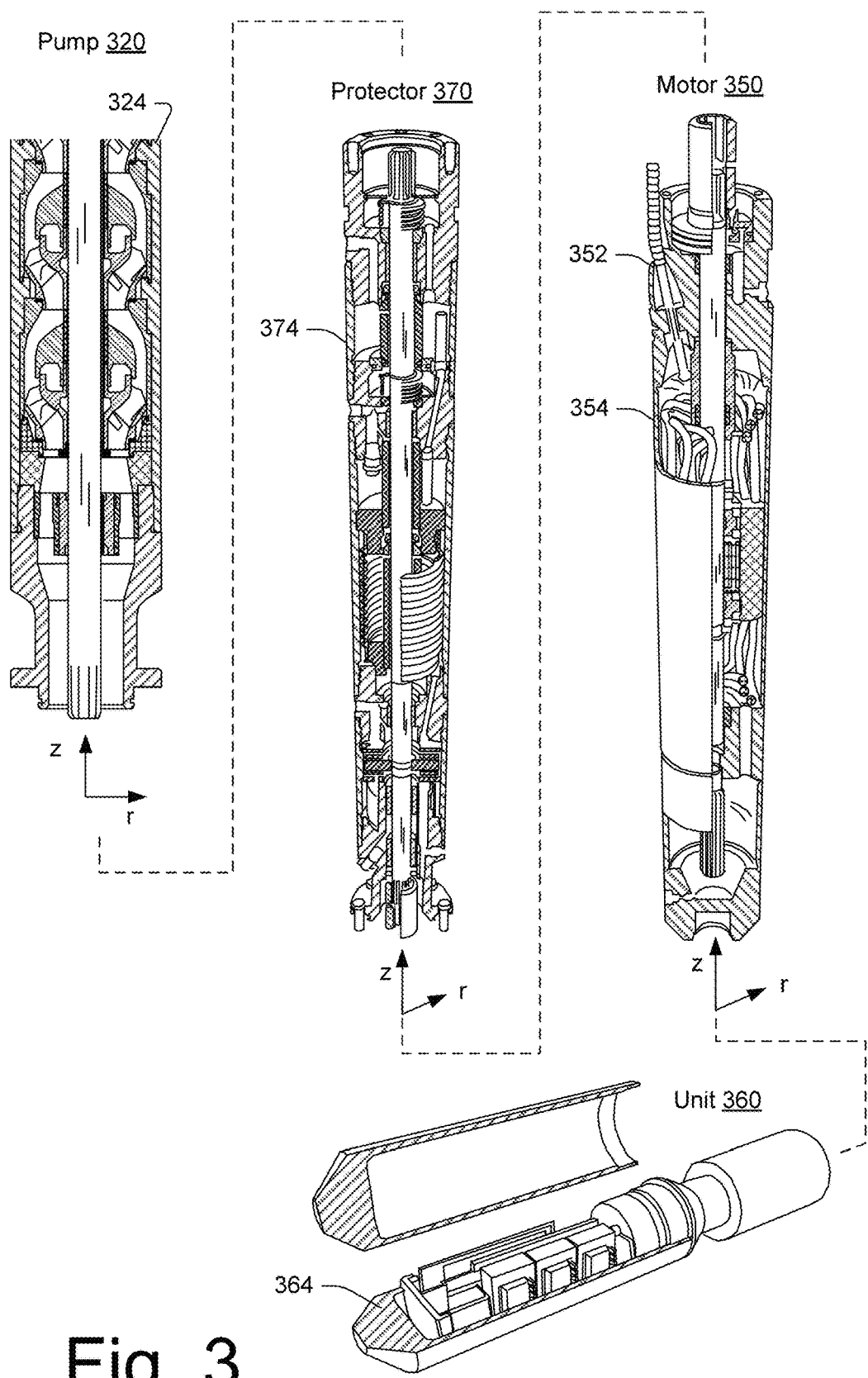
FIG. 3 illustrates examples of equipment.

FIG. 3 shows cut-away views of examples of equipment such as, for example, a portion of a pump 320, a protector 370, a motor 350 of an ESP and a sensor unit 360. In the examples of FIG. 3, each of the pieces of equipment may be considered to be assemblies that, for example, can be operatively coupled to form a system (e.g., an ESP or ESP system). In FIG. 3, the pump 320, the protector 370, the motor 350 and the sensor unit 360 are shown with respect to cylindrical coordinate systems (e.g., r, z, □). Various features of equipment may be described, defined, etc. with respect to a cylindrical coordinate system. As an example, a lower end of the pump 320 may be coupled to an upper end of the protector 370, a lower end of the protector 370 may be coupled to an upper end of the motor 350 and a lower end of the motor 350 may be coupled to an upper end of the sensor unit 360 (e.g., via a bridge or other suitable coupling).

As shown in FIG. 3, a shaft segment of the pump 320 may be coupled via a connector to a shaft segment of the protector 370 and the shaft segment of the protector 370 may be coupled via a connector to a shaft segment of the motor 350. As an example, an ESP may be oriented in a desired direction, which may be vertical, horizontal or other angle (e.g., as may be defined with respect to gravity, etc.). Orientation of an ESP with respect to gravity may be considered as a factor, for example, to determine ESP features, operation, etc.

As shown in FIG. 3, the motor 350 is an electric motor that includes a connector 352, for example, to operatively couple the electric motor to a multiphase power cable, for example, optionally via one or more motor lead extensions. Power supplied to the motor 350 via the connector 352 may be further supplied to the sensor unit 360, for example, via a wye point of the motor 350 (e.g., a wye point of a multiphase motor).

As an example, a connector may include features to connect one or more transmission lines, optionally dedicated to a monitoring system. For example, the connector 352 may include a socket, a pin, etc., that can couple to a transmission line dedicated to the sensor unit 360. As an example, the sensor unit 360 can include a connector that can connect the sensor unit 360 to a dedicated transmission line or lines, for example, directly and/or indirectly.

As an example, the motor 350 may include a transmission line jumper that extends from the connector 352 to a connector that can couple to the sensor unit 360. Such a transmission line jumper may be, for example, one or more conductors, twisted conductors, an optical fiber, optical fibers, a waveguide, waveguides, etc. As an example, the motor 350 may include a high-temperature optical material that can transmit information. In such an example, the optical material may couple to one or more optical transmission lines and/or to one or more electrical-to-optical and/or optical-to-electrical signal converters.

In the examples of FIG. 3, one or more coated electrical conductors may be present. For example, the pump 320 may include one or more coated electrical conductors operatively coupled to and/or part of sensor circuitry and/or another type of circuitry; the protector 370 may include one or more coated electrical conductors operatively coupled to and/or part of sensor circuitry and/or another type of circuitry; the motor 350 may include one or more coated electrical conductors operatively coupled to and/or part of sensor circuitry, electric motor circuitry and/or another type of circuitry; and the unit 360 may include one or more coated electrical conductors operatively coupled to and/or part of sensor circuitry and/or another type of circuitry.

In the examples of FIG. 3, the pump 320 can include a housing 324, the protector 370 can include a housing 374, the motor 350 can include a housing 354 and the unit 360 can include a housing 364. In such examples, a housing can include opposing ends, a longitudinal axis, an axial length defined between the opposing ends, a maximum transverse dimension that is less than the length and an interior space. As an example, circuitry may be disposed at least in part in the interior space. As an example, a coated electrical conductor can be electrically coupled to such circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer.

As an example, an interior space of an assembly may be sealed via one or more seal elements, joints, etc. As an example, the equipment 150 of FIG. 1 can include a sealed motor or a motor included in a sealed housing. As an example, the equipment 170 of FIG. 1 can include a sealed housing that aims to protect the one or more actuators 182, the one or more sensors 184 and/or the one or more other components from fluid in a downhole environment. As an example, the one or more conductors 180 may include one or more coated electrical conductors. As an example, the equipment 150 and/or the equipment 170 can be assemblies that include a coated electrical conductor electrically coupled to circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer.

As to the pump 320, the motor 350, the unit 360 and the protector 370 of FIG. 3, these may be individual assemblies that include a coated electrical conductor electrically coupled to circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer. As an example, one or more of such assemblies can include one or more sealed interior spaces, for example, consider a housing that includes one or more seal elements, one or more joints, etc. that aim to protect circuitry, etc., in the interior space or spaces from fluid in a downhole environment. As an example, an assembly can include an encapsulant or encapsulating material in an interior space. As an example, an assembly can include a specialized fluid in an interior space (e.g., a dielectric oil, etc.).

As an example, where water and/or gas (e.g., $CO_2$, $H_2S$) penetrates a housing and enters an interior space, a coated electrical conductor can include an electrical conductor that includes copper and a length defined by opposing ends, a polymeric electrical insulation layer disposed about at least a portion of the length of the electrical conductor, and a barrier layer disposed about at least a portion of the polymeric electrical insulation layer where the barrier layer acts to protect the polymeric electrical insulation layer from the water and/or gas. In such an example, the barrier layer may prolong the useful life (e.g., operational life) of an assembly.

Figure 4:
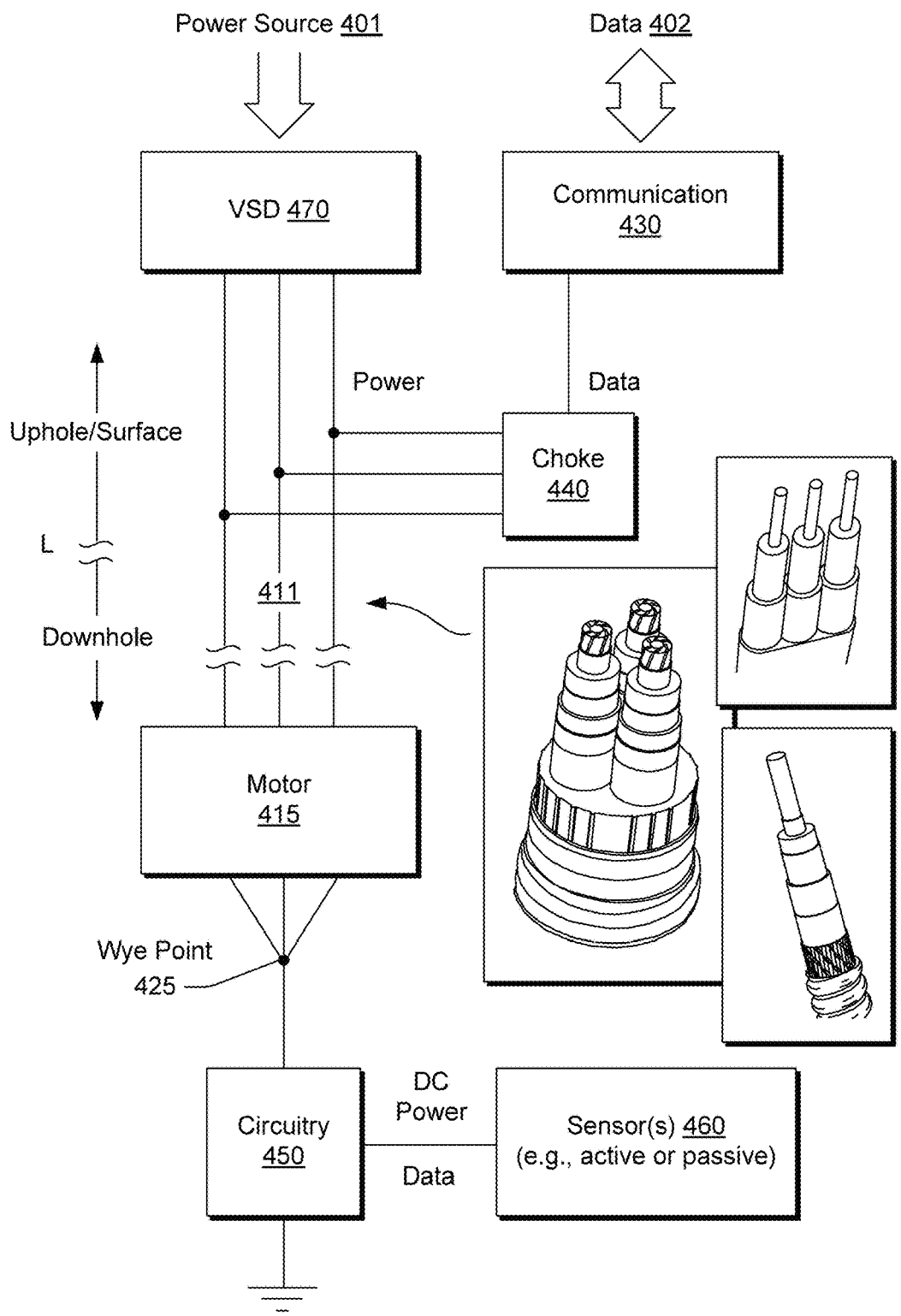
FIG. 4 illustrates an example of a system that includes a motor.

FIG. 4 shows a block diagram of an example of a system 400 that includes a power source 401 as well as data 402 (e.g., information). The power source 401 provides power to a VSD block 470 while the data 402 may be provided to a communication block 430. The data 402 may include instructions, for example, to instruct circuitry of the circuitry block 450, one or more sensors of the sensor block 460, etc. The data 402 may be or include data communicated, for example, from the circuitry block 450, the sensor block 460, etc. In the example of FIG. 4, a choke block 440 can provide for transmission of data signals via a power cable 411 (e.g., including motor lead extensions "MLEs"). A power cable may be provided in a format such as a round format or a flat format with multiple conductors. MLEs may be spliced onto a power cable to allow each of the conductors to physically connect to an appropriate corresponding connector of an electric motor (see, e.g., the connector 352 of FIG. 3). As an example, MLEs may be bundled within an outer casing (e.g., a layer of armor, etc.).

As shown, the power cable 411 connects to a motor block 415, which may be a motor (or motors) of an ESP and be controllable via the VSD block 470. In the example of FIG. 4, the conductors of the power cable 411 electrically connect at a wye point 425. The circuitry block 450 may derive power via the wye point 425 and may optionally transmit, receive or transmit and receive data via the wye point 425. As shown, the circuitry block 450 may be grounded.

As an example, a cable as in FIG. 4 can include multiple conductors where each conductor can carry current of a phase of a multiphase power supply for a multiphase electric motor. In such an example, a conductor may be in a range from about 8 AWG (about 3.7 mm) to about 00 AWG (about 9.3 mm).

TABLE 1

Examples of some components.

| Cable Component | Dimensions |
|---|---|
| Conductor (Cu) | 8 AWG to 00 AWG (3.7 mm to 9.3 mm) |
| Insulation | 58 mils to 130 mils (1.5 mm to 3.3 mm) |
| Lead (Pb) | 20 mils to 60 mils (0.5 mm to 1.5 mm) |
| Jacket over Lead (Pb) | 20 mils to 85 mils (0.5 mm to 2.2 mm) |
| Armor (e.g., optional) | 10 mils to 120 mils (0.25 mm to 3.0 mm) |
| Polymeric Coat (e.g., optional) | 20 mils to 60 mils (0.5 mm to 1.5 mm) |

As an example, a cable as in FIG. 4 may include conductors for delivery of power to a multiphase electric motor with a voltage range of about 3 kV to about 8 kV. As an example, a cable may carry power, at times, for example, with amperage of up to about 200 A or more. As an example, a cable may carry current to power a multiphase electric motor or other piece of equipment (e.g., downhole equipment powerable by a cable).

As noted above, in the example of FIG. 4, a conductor may be in a range from about 8 AWG (about 3.3 mm) to about 00 AWG (about 9.3 mm). As to magnet wire or other type of wire that may be insulated, a conductor may be in a range from about 28 AWG (about 0.3 mm) to about 1 AWG (about 7.3 mm). As mentioned, magnet wire may be used in construction of an electric motor or in construction of various other types of equipment (e.g., wireline equipment, etc.).

As an example, a cable or other type of component that can be suitable for use in a fluid environment (e.g., a submersible component) can include one or more types of polymers (e.g., one or more types of polymeric materials, etc.). As an example, a polymeric material can include one or more types of polymers. A polymer may be considered to be a relatively large molecule or macromolecule composed of subunits. Polymers are created via polymerization of smaller molecules that can include molecules known as monomers. Polymers may be characterized by physical properties such as, for example, toughness, viscoelasticity, tendency to form glasses and semicrystalline structures, melting temperature, etc.

As an example, a polymeric material can be an electrical insulator. As an example, a polymeric material can be a dielectric material that is an electrical insulator. A dielectric material or dielectric is an electrical insulator that can be polarized by an applied electric field. As an example, a polymeric material can be characterized at least in part by a dielectric constant. For example, KAPTON™ polyimide film (marketed by E. I. Du Pont de Nemours and Company, Wilmington, Del.) can be characterized by a dielectric constant that can depend on humidity where the dielectric constant increases with respect to increasing relative humidity (RH), for example, from about 3 to about 4 for an increase from about 0 percent RH to about 100 percent RH (e.g., for a 1 mil film of KAPTON® type HN polymer). Such water-related changes in properties are due to polyimide films being formed by condensation reactions. Polyimide, when exposed to water, can degrade via hydrolytic attack. The kinetics of hydrolytic degradation can depend on temperature and pressure as well as, for example, presence of other constituents in an environment.

In Table 1, the insulation may be a polymeric material. As an example, the insulation may be a polymeric material that is or includes polyimide. In such an example, the lead (Pb) layer can be a barrier layer that acts to protect the insulation. For example, the lead (Pb) layer can reduce permeation of water, $H_2S$, $CO_2$ or one or more other constituents that can degrade the insulation and/or otherwise impact its dielectric properties (e.g., ability to insulate a conductor). While lead (Pb) is mentioned as a barrier material, one or more other types of barrier materials may be utilized, which may be, for example, one or more of metallic material, ceramic material, and polymeric material.

As an example, a magnet wire can include insulation and a barrier layer disposed about the insulation where the insulation may be or include polymeric material and where the barrier layer includes barrier material that can reduce permeation of water, $H_2S$, $CO_2$ or one or more other constituents that can degrade the insulation and/or otherwise impact its dielectric properties (e.g., ability to insulate a conductor). As an example, a barrier material can include one or more of metallic material, ceramic material, and polymeric material.

Figure 5:
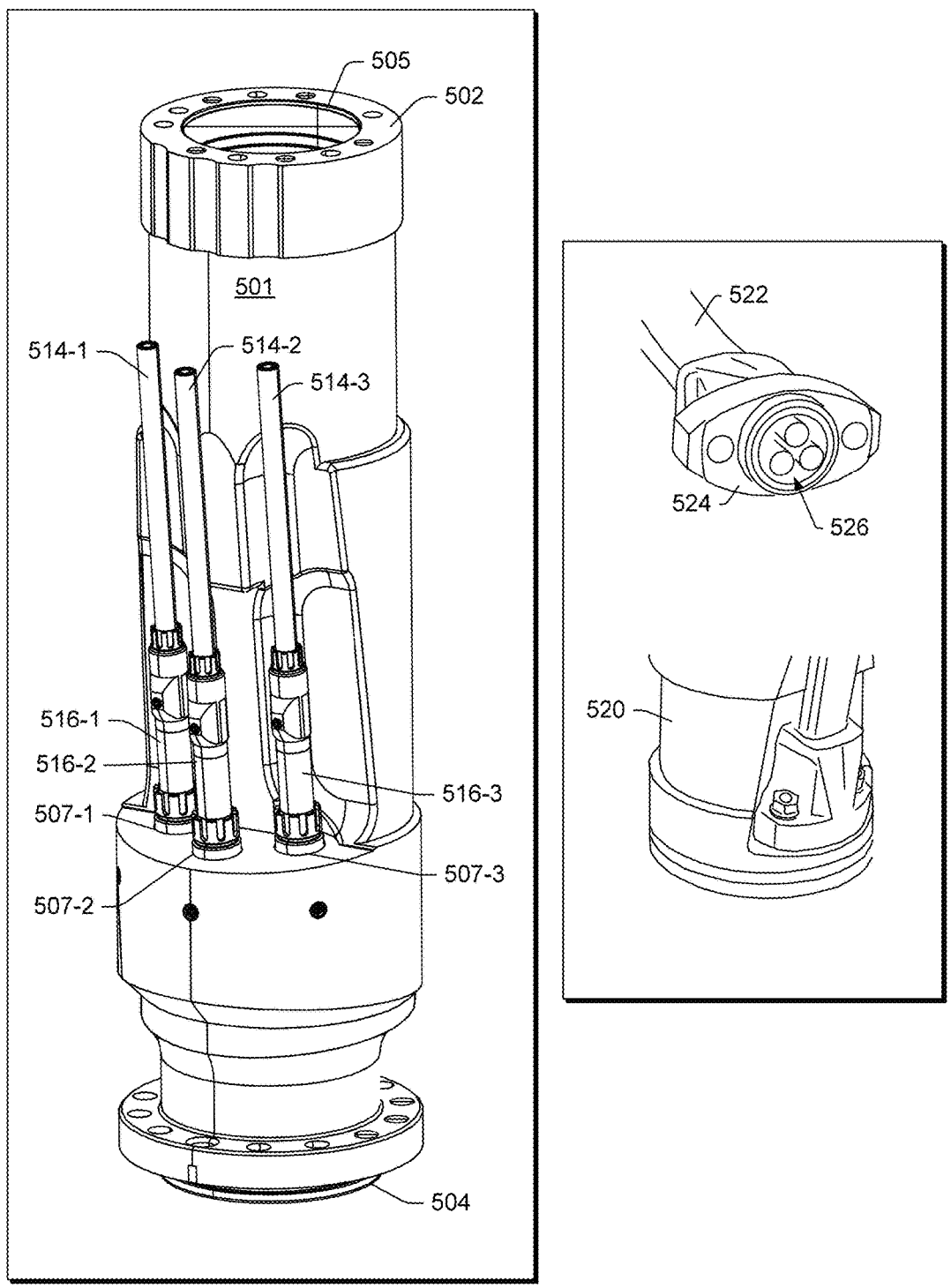
FIG. 5 illustrates examples of equipment.

FIG. 5 shows various examples of motor equipment. A pothead unit 501 includes opposing ends 502 and 504 and a through bore, for example, defined by a bore wall 505. As shown, the ends 502 and 504 may include flanges configured for connection to other units (e.g., a protector unit at the end 502 and a motor unit at the end 504). The pothead unit 501 includes cable passages 507-1, 507-2 and 507-3 (e.g., cable connector sockets) configured for receipt of cable connectors 516-1, 516-2 and 516-3 of respective cables 514-1, 514-2 and 514-3. As an example, the cables 514-1, 514-2 and 514-3 and/or the cable connectors 516-1, 516-2 and 516-3 may include one or more polymeric materials. For example, a cable may include polymeric insulation while a cable connector may include polymeric insulation, a polymeric component (e.g., a bushing), etc. As an example, the cables 514-1, 514-2 and 514-3 may be coupled to a single larger cable. The single larger cable may extend to a connector end for connection to a power source or, for example, equipment intermediate the cable and a power source (e.g., an electrical filter unit, etc.). As an example, a power source may be a VSD unit that provides three-phase power for operation of a motor.

FIG. 5 also shows a pothead unit 520 that includes a socket 521. As an example, a cable 522 may include a plug 524 that can couple to the socket 521 of the pothead unit 520. In such an example, the cable 522 may include one or more conductors 526. As an example, a cable may include at least one fiber optic cable or one or more other types of cables. As an example, a fiber optic cable can include a layer of polymeric material where a barrier layer may be disposed over the layer of polymeric material. In such an example, the barrier layer may help to protect the layer of polymeric material from one or more constituents in an environment. As an example, a fiber optic cable may be suitable for use in a fluid environment where the fiber optic cable is a submersible fiber optic cable.

As explained above, equipment may be placed in a geologic environment where such equipment may be subject to conditions associated with function or functions of the equipment and/or be subject to conditions associated with the geologic environment. Equipment may experience conditions that are persistent (e.g., relatively constant), transient or a combination of both. As an example, to enhance equipment integrity (e.g., reduction in failures, increased performance, longevity, etc.), equipment may include at least one polymeric material and at least one barrier layer disposed about at least one of the at least one polymeric material.

Figure 6:
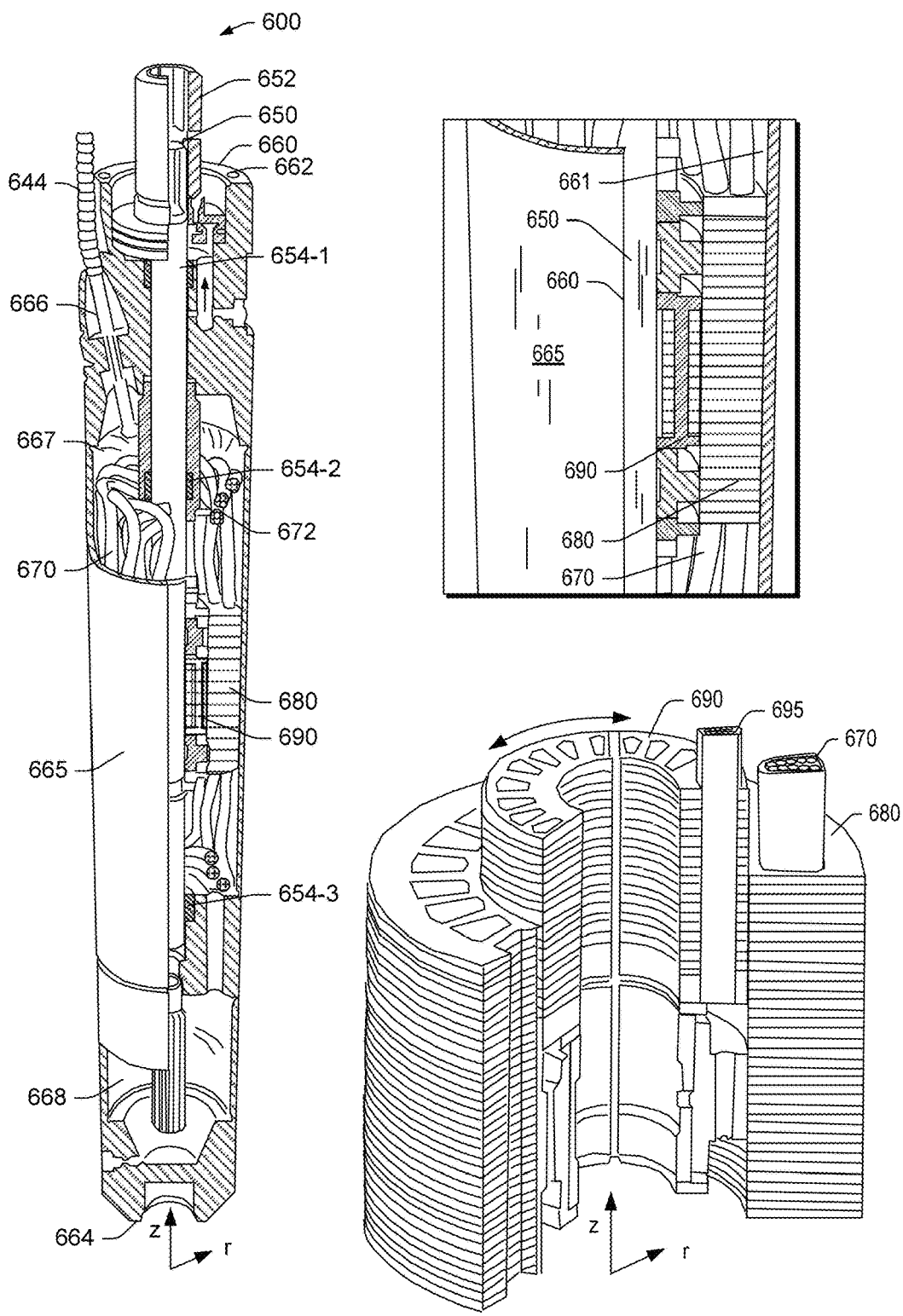
FIG. 6 illustrates examples of equipment.

FIG. 6 shows a perspective cut-away view of an example of a motor assembly 600 that includes a power cable 644 (e.g., MLEs, etc.) to supply energy, a shaft 650, a housing 660 that may be made of multiple components (e.g., multiple units joined to form the housing 660), stacked laminations 680, stator windings 670 of wire (e.g., magnet wire) and rotor laminations 690 and rotor windings 695 coupled to the shaft 650 (e.g., rotatably driven by energizing the stator windings 670).

As shown in FIG. 6, the housing 660 includes an inner surface 661 and an outer surface 665. As an example, the housing 660 can define one or more cavities via its inner surface 661 where one or more of the cavities may be hermetically sealed. As an example, such a cavity may be filled at least partially with dielectric oil. As an example, dielectric oil may be formulated to have a desired viscosity and/or viscoelastic properties, etc.

As shown, the shaft 650 may be fitted with a coupling 652 to couple the shaft to another shaft. A coupling may include, for example, splines that engage splines of one or more shafts. The shaft 650 may be supported by bearings 654-1, 654-2, 654-3, etc. disposed in the housing 660.

As shown, the housing 660 includes opposing axial ends 662 and 664 with the substantially cylindrical outer surface 665 extending therebetween. The outer surface 665 can include one or more sealable openings for passage of oil (e.g., dielectric oil), for example, to lubricate the bearings and to protect various components of the motor assembly 600. As an example, the motor assembly 600 may include one or more sealable cavities. For example, a passage 666 allows for passage of one or more conductors of the cable 644 (e.g., or cables) to a motor cavity 667 of the motor assembly 600 where the motor cavity 667 may be a sealable cavity. As shown, the motor cavity 667 houses the stator windings 670 and the stator laminations 680. As an example, an individual winding may include a plurality of conductors (e.g., magnet wires). For example, a cross-section 672 of an individual winding may reveal a plurality of conductors that are disposed in a matrix (e.g., of material or materials) or otherwise bound together (e.g., by a material or materials). In the example of FIG. 6, the motor housing 660 includes an oil reservoir 668, for example, that may include one or more passages (e.g., a sealable external passage and a passage to the motor cavity 667) for passage of oil.

As an example, a shaft may be reciprocating, for example, where a shaft includes one or more magnets (e.g., permanent magnets) that respond to current that passes through stator windings.

As an example, a polymeric matrix may be formed of organic and/or inorganic monomeric and/or polymeric materials. As an example, one or more of an epoxy, bismaleimide, polybutadiene, benzoxazine, cyanate ester, silicone, Ring-Opening Metathesis Polymers (ROMP), and preceramic polymers may be utilized.

As an example, one or more monomers and/or polymers may be amphiphilic, which may facilitate blending in one or more fillers. As an example, the functionalized linseed oil marketed as DILULIN™ material (Cargill, Inc., Wayzata, Minn.) is amphiphilic and can allow for increasing content of one or more inorganic fillers of a composite material.

As an example, a polymeric material can be thermally conductive and electrically insulative and be utilized to encapsulate windings of an electric motor. Such an approach may provide for lower winding temperatures and end coil temperatures through heat dissipation.

An electric motor may include a coil retention system such as, for example, a full winding encapsulation type, a varnished windings type, or an end coil retention type (e.g., one that does not support wires in slots). As an example, a glass-fiber tape can be included in a coil retention system where, for example, the glass-fiber tape is wrapped around end turns and where the glass-fiber tape is impregnated with a crosslinking resin.

As an example, an encapsulation technique can depend on the type of coil retention system employed. For example, the use of a thermosetting polymer can depend on the type of coil retention system. An encapsulated system can involve use of one or more materials and one or more particular processes. As an example, varnished windings approach can include use of a solvent-based polybutadiene system, which tends to be more elastomeric than structural. An end coil retention resin can be a silica-filled epoxy, which has suitable structural properties due in part to the fact that the end coil retention provides coil stabilization while holding the end turns and while not supporting wires in the slots.

As an example, to maintain mechanical robustness of magnet wire wrapped in a stator of an electric motor, insulated motor windings may use a coil retention system where at least ends of coils are held in place by a structural composite that includes fibrous reinforcement (e.g., one or more of glass, quartz, aramid, etc.) and an organic and/or inorganic polymer matrix.

As to dielectric fluids (e.g., motor oils, etc.), consider as examples one or more of purified mineral oils, polyalphaolefin (PAO) synthetic oils, PFPE (polyperfluoroether), etc. Such dielectric fluids can be relatively resistance to well fluid(s), which can thereby allow an electric motor to function in case of leakage well fluid.

Figure 7:
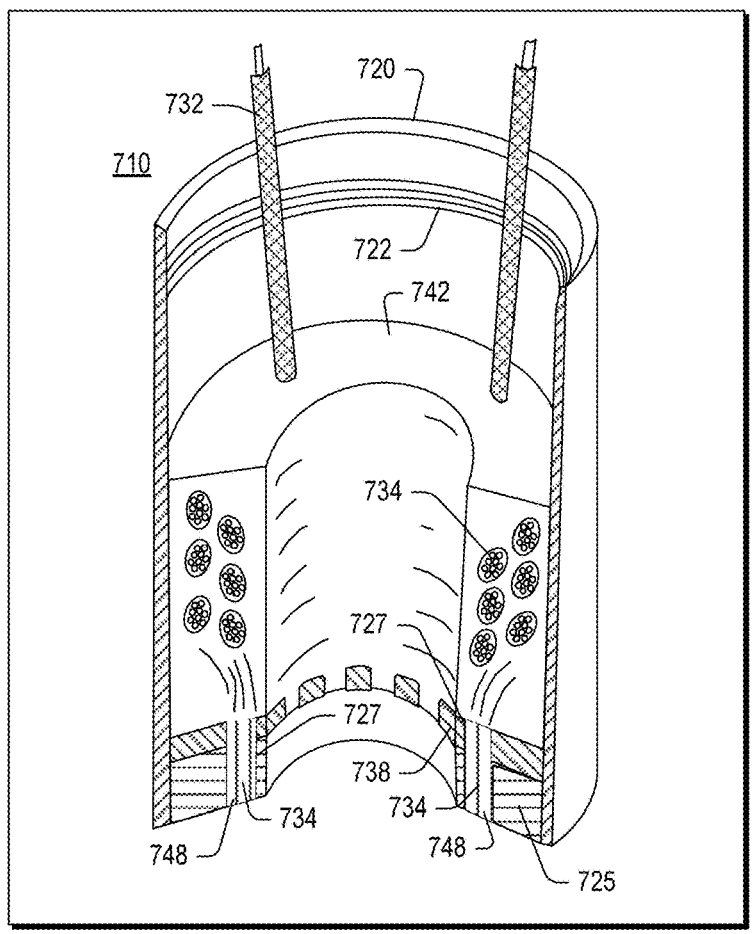
FIG. 7 illustrates examples of equipment.
Figure 7:
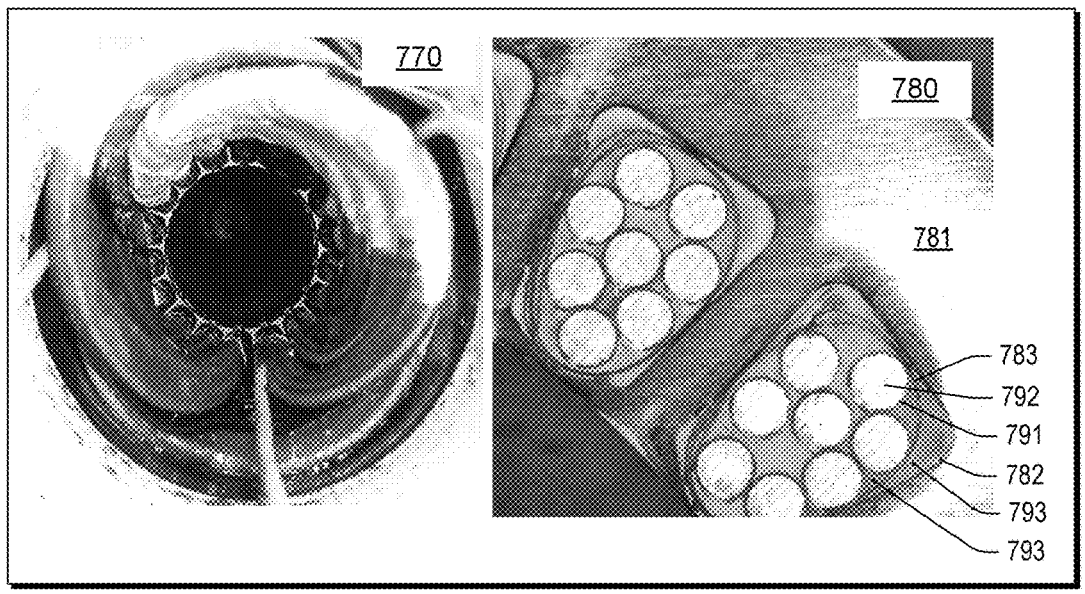

FIG. 7 shows an example of an electric motor 710, an example of a photograph of a portion of an electric motor 770 and a photograph 780 of a portion of an electric motor.

As shown in FIG. 7, the electric motor 710 includes a housing 720 with threads 722. Lead wires (e.g., brush wires) 732 are shown where a number of such wires can correspond to a number of phases. For example, for a three phase electric motor, there can be three lead wires 732 (e.g., two being shown in the cutaway view). The lead wires 732 can be associated with a top or uphole end of an electric motor; whereas, at a bottom or downhole end, a wye point may exist where phases are electrically coupled. As an example, a wye point may be electrically coupled to one or more other components such as, for example, a gauge (e.g., a sensor unit, etc.).

As shown in the example of FIG. 7, the lead wires 732 are electrically coupled to phase windings or phase coils where ends of the windings or coils 734 can extend downward through slots 727 in laminations 725. As shown in the example of FIG. 7, a polymeric material 742, which may optionally be a polymeric composite material (e.g., polymeric material that includes one or more fillers) contacts the ends of the windings or coils 734 and a portion of the polymeric material 742 extends downwardly through the slots 727 in the laminations 725.

In the example of FIG. 7, a molding insert may be utilized to contain the polymeric material 742 (e.g. encapsulant material) during curing of the polymeric material (e.g., where reactions occur involving at least in part monomers, etc.).

As an example, a method can include an injection process for injecting the polymeric material 742 into a cavity of the housing 720 to contact ends of windings or coils (e.g., of magnet wire), a molding process for molding the polymeric material 742 about the ends of the windings or coils in a manner to not interfere with other components of an electric motor (e.g., to create a shaft space and/or rotor space, etc.), an assembly process for assembling an electric motor 710 that includes the stator disposed in the housing 720 and an assembly process for assembly of a downhole tool that can utilize the electric motor 710 (e.g., an ESP, etc.).

As an example, an electric motor of an ESP may have a substantially cylindrical shape with a diameter of about 18 cm and an axial length of about 10 m. In such an example, a volume of encapsulant may be of the order of tens of liters.

As an example, for an electric motor of another type of downhole tool, a volume may be in a range where a lower limit of the range is of the order of milliliters. As an example, a downhole tool may be a wireline tool. As an example, a downhole tool may be a completions tool. As an example, a downhole tool can include an electric motor that has a substantially cylindrical shape. In such an example, consider, as an example, a total volume of about 350 milliliters, a length of about 12 cm and a diameter of about 5 cm. Of the total volume, a fraction thereof can be encapsulant (e.g., an encapsulant volume of the order of tens of milliliters).

In the example of FIG. 7, the photograph 770 shows a portion of an electric motor where resin is applied to glass fabric for the lower portion of the windings shown in the photograph 770 (e.g., upper portion shows the glass fabric without the resin). As an example, windings can be held in place by a polymeric material (e.g., optionally a polymeric composite material) that completely encapsulates end turns and that fills slots. In such an example, air voids may be substantially removed through use of vacuum impregnation and degassing while prepolymer is heated to a low viscosity prior to gelation.

Thermally conductive encapsulants can improve reliability of ESP systems by decreasing motor winding temperatures. Applications can include SAGD, subsea, geothermal, etc. Such materials may be suitable for use in equipment for drilling and measurement operations (e.g., D&M).

In the example of FIG. 7, the photograph 780 of an example of a portion of a product (e.g., a portion of an example of a stator). In particular, the photograph 780 shows a lamination 781 that includes a slot 782 where slot liner material 783 defines an interior space such that the slot liner material 783 surrounds magnet wire 792 that includes insulation 791. As shown in the photograph 780, polymeric material 793, which may be polymeric composite material, is disposed exteriorly and interiorly with respect to the slot liner material 783. As an example, the insulation 791 can be of the order of about 0.1 mm to about 0.3 mm. As an example, the slot liner material 783 can be a polymeric film that may be of one or more layers where a layer of the film may be of the order of about 0.1 mm to about 0.3 mm. As shown, the polymeric material 793 can at least partially fill spaces defined by the slot 782 of the lamination 781. As an example, an individual plate may be formed of carbon steel with an oxide coating where a plurality of such plates can be stacked to form the laminations.

As an example, heat energy generated during operation of an electric motor that includes the stator of the photograph 780 may be transferred to the polymeric material 793. For example, current in the magnet wire 792 can generate heat due at least in part to resistance of the magnet wire 792. As the polymeric material 793 is in contact with the magnet wire 792 (e.g., via the electrical insulation 791) it can conduct at least a portion of the heat energy away from the magnet wire 792, noting that resistance of the magnet wire 792 may depend on temperature (e.g., consider a wire where resistance increases with temperature or, in other words, where the wire becomes less efficient as temperature increases).

As an example, insulation may include one layer or multiple layers of a high temperature polymeric dielectric material. As an example, polymeric insulating material may be in the form of tape that may be applied helically or longitudinally (e.g., by wrapping polyimide tape onto a conductor in an overlap configuration). As an example, a polymeric insulating material may be extruded.

As an example, multiple layers may be applied to a conductor (e.g., directly or indirectly). As an example, a polymer insulator layer may be a polyimide film. As an example, a polymer insulator may be commercially available (e.g., consider various polymers marketed under the mark DuPont™). As to a polyimide, as an example, the DuPont™ KAPTON™ polymer 150PRN411 may be used as polymer insulation; where "150" indicates a 1.5 mils (e.g., about 0.04 mm) overall tape thickness, where "PRN" indicates an HN polyimide film with a high temperature fluoropolymer adhesive, where "4" indicates a 0.0004 inch (e.g., about 0.01 mm) thick high temperature adhesive on the bottom side of the tape, where the first "1" indicates the thickness of the polyimide film and where the second "1" indicates a 0.0001 inch (e.g., about 0.0025 mm) thick high temperature adhesive on the top side of the tape. As an example, polyimide may be deposited via an extrusion process.

As mentioned, polymeric materials such as polyimide may be hydrolytically attacked when moisture is present, for example, in a manner that can depend on conditions such as pH, temperature, etc. As mentioned, a barrier material may be utilized to form a barrier layer about a polymeric material that can be an insulator for a conductor. For example, the magnet wire 792 shown in FIG. 7 can include a polymeric material layer and a barrier material layer disposed about the polymeric material layer where the barrier material layer acts to protect the polymeric material layer from one or more constituents in an environment (e.g., water, $H_2S$, $CO_2$, etc.).

As to degradation of polyimide, a study by Campbell (Temperature Dependence, of Hydrolysis of Polyimide Wire Insulation, NRL Memorandum Report 5158, 1983), which is incorporated by reference herein, found that degradation of KAPTON' polyimide film in aqueous media is due to a hydrolytic chain scission mechanism occurring at amide linkages and that water will attack the polyimide chain and produce degradation. The study also found that increasing the temperature of exposure accelerated degradation, which could be modeled by an Arrhenius rate equation that could be used to estimate lifetime of a polyimide insulated conductor for a given service temperature in the presence of deionized water, with possible extension of such a technique to humidity.

Various types of equipment can include polyether ether ketone (PEEK) as a thermoplastic polymeric material, polyimide as a polymeric material, etc., for example, as material for one or more of insulation, encapsulation and connectors.

As mentioned, water can degrade various types of polymeric materials. For example, water phases at high temperatures (e.g. SAGD) and pressures can rapidly degrade polyimides and thereby reduce mean time between failures (MTBF) of equipment. Environments that include $H_2S$ and water can degrade materials. For example, sour high-pressure conditions where $H_2S$ and water are present, polymer insulation degradation may occur at a relatively rapid rate.

As an example, one or more methods can be utilized to manufacture insulated conductors that exhibit resistance to water, steam, gas, etc., which may thereby impart reliability and/or usability in particular environments.

Figure 8:
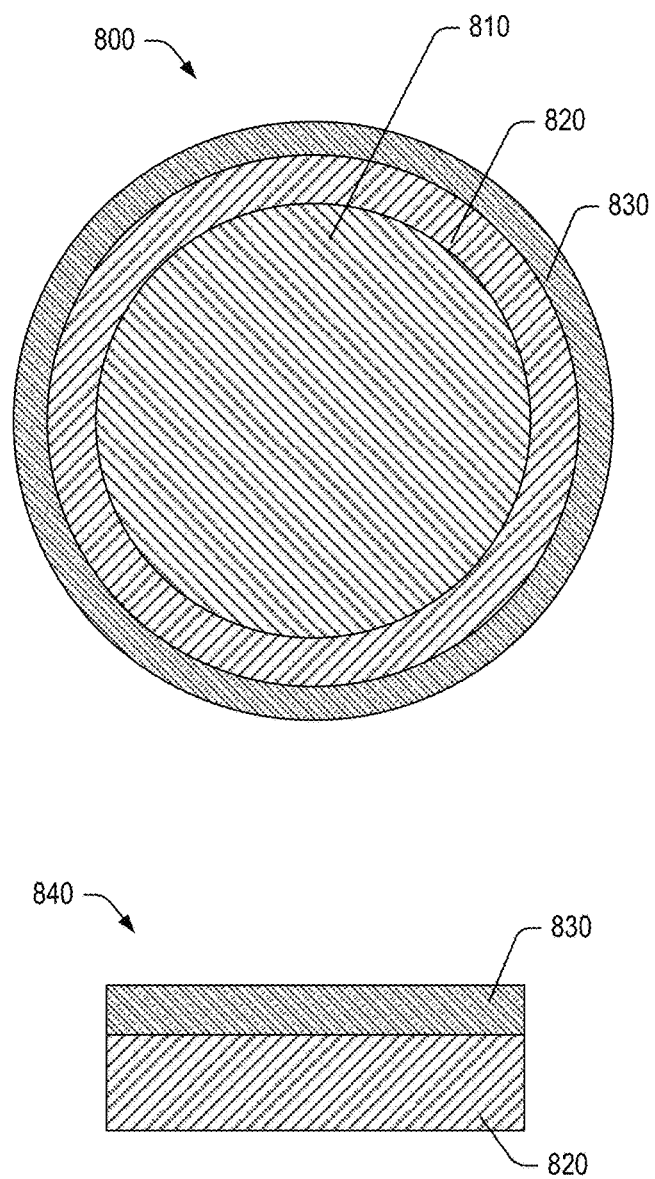
FIG. 8 illustrates an example of an insulated conductor.

FIG. 8 shows an example of an insulated conductor 800 (e.g., a coated conductor) that includes a conductor 810, insulation 820 and an insulation barrier 830. In such an example, the insulation 820 and the insulation barrier 830 may be applied separately or as the insulation 820 with the insulation barrier 830 present, which is illustrated as a metallized polymeric material 840.

As an example, a metallized polymer layer may be applied as insulation to a conductor. In such an example, the metallized portion can act as a gas barrier and a water barrier (e.g., to steam, moisture, etc.).

As an example, an insulation barrier can include one or more of aluminum, steel and ferrous alloys (e.g., including stainless), nickel, and one or more other metals.

As an example, an insulation barrier can include a metal and/or an alloy that exhibits corrosion resistance as to water-based corrosion at its surface and, for example, that exhibits relatively low-hydrogen permeability.

Figure 9:
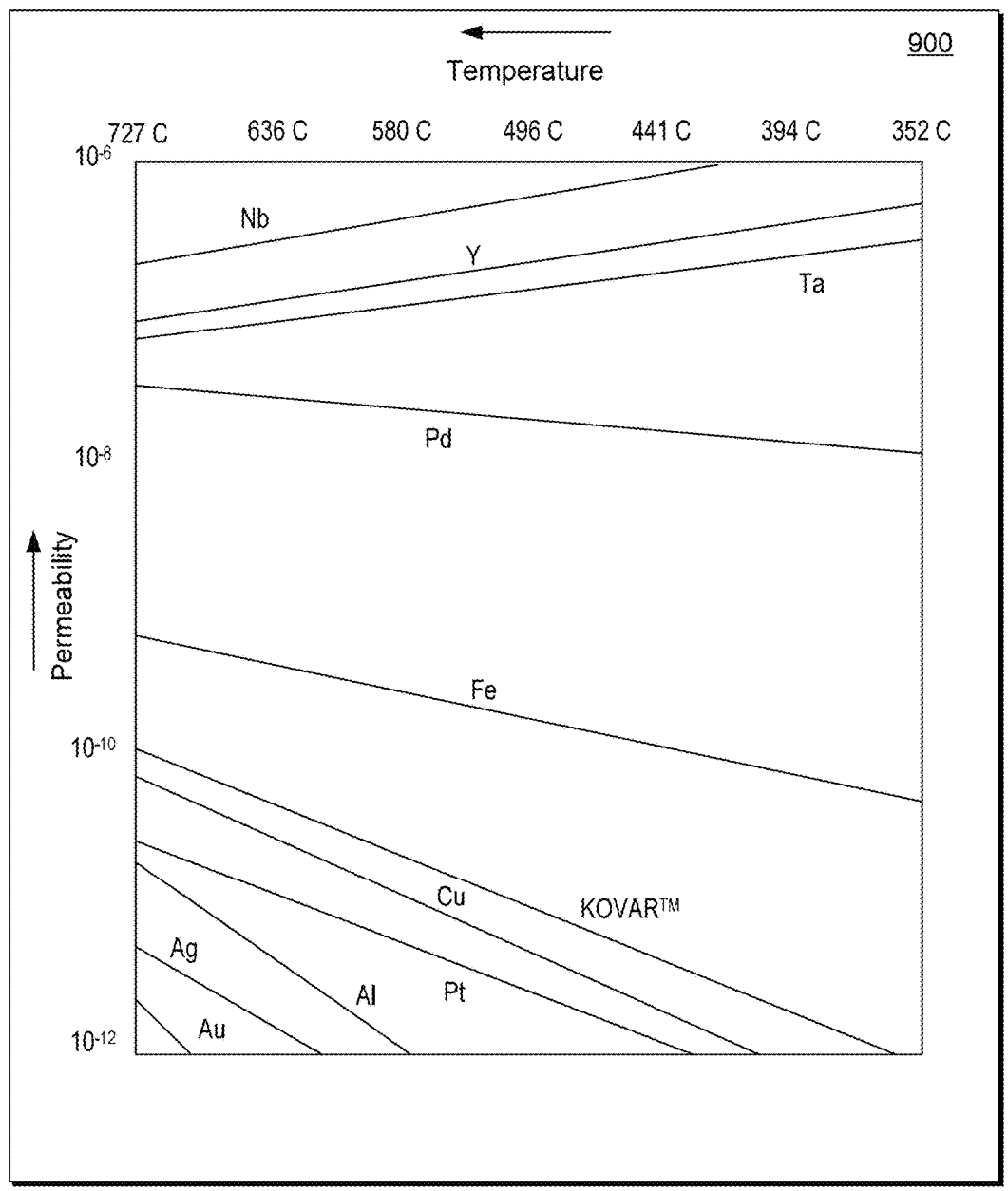
FIG. 9 illustrates an example of a plot of data for metallic materials and permeability with respect to temperature.

FIG. 9 shows an example of a plot 900 of hydrogen permeability with respect to temperature (temperature increasing from right to left) where various metals are unoxidized. As an example, an insulation barrier can include one or more metals with stable passive layers. For example, consider a metal that does not corrode and that forms a protective film (e.g., aluminum and aluminum oxide, etc.). As an example, an insulation barrier can include iron, for example, consider one or more types of stainless steel.

As an example, a barrier material for forming a barrier layer can include nickel. As an example, a barrier material for forming a barrier layer can include a nickel alloy. As an example, a barrier material for forming a barrier layer can include a nickel and cobalt alloy such as, for example, a KOVAR™ alloy (CRS Holdings, Inc., Wilmington, Del.), which is a nickel-cobalt ferrous alloy (i.e., an iron-nickel-cobalt alloy) that can include silicon (e.g., less than about 1 percent) and manganese (e.g., less than about 1 percent) with about 17 percent cobalt, about 29 percent nickel and about 54 percent iron.

As an example, a barrier material for forming a barrier layer can include lead (Pb), which can be a lead (Pb) alloy.

As an example, a barrier material can have a permeability less than about $10^{-10}$ mols $H_2$/m·s·$Pa^{0.5}$ for temperatures less than about 500 degrees C. As an example, a barrier material can include a metal, optionally as an alloy, that has a permeability less than about $10^{-10}$ mols $H_2$/m·s·$Pa^{0.5}$ for temperatures less than about 500 degrees C. As an example, lead (Pb) exhibits a permeability less than about $10^{-10}$ mols $H_2$/m·s·$Pa^{0.5}$ for temperatures less than about 500 degrees C.

As an example, a polymer or polymers may provide for water (e.g., humidity, steam, etc.) resistance and/or act as a gas barrier. Some examples of polymers include polyaliphatic ketones, fluoropolymers, functionally modified fluoropolymers, polyvinylidene fluoride (PVDF) polymers, and poly (arylene ether) polymers.

As mentioned, a metallized polymer composite insulation layer can be manufactured about a conductor. Such a metallized polymer composite insulation layer may be manufactured via a process that can include extrusion of polymeric material and deposition, taping, etc. of metallic material.

Figure 10:
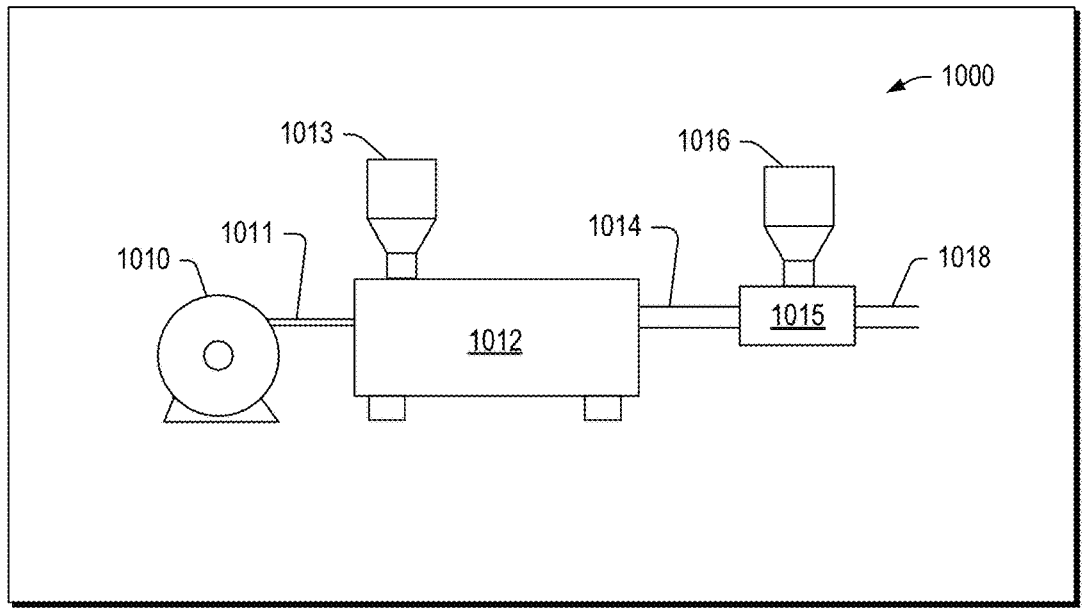
FIG. 10 illustrates examples of equipment.

FIG. 10 shows examples of equipment 1000 that include a reel 1010 that can supply a conductor 1011 to an extruder 1012 that includes a supply of polymeric material 1013 where the extruder 1012 can deposit the polymeric material 1013 as a polymeric material layer 1014 about the conductor 1011. As shown in the example of FIG. 10, metallic deposition equipment 1015 includes a supply of metallic material 1016 that can be deposited as a metallic layer 1018 about the polymeric material layer 1014. As an example, the metallic deposition equipment 1015 can perform a metallizing process such as, for example, a spray process (e.g., cold spray, etc.), a chamber deposition processes, etc. In the example of FIG. 10, the processes can be in-line for continuous manufacturing.

As an example, a polymeric material may be metallized via deposition of metallic material onto a surface of the polymeric material. As an example, physical vapor deposition from an evaporation source may be utilized where metallic material is melted in a high vacuum chamber and allowed to condense on a surface of polymeric material, which may be moving at a relatively close distance to the evaporation source. As an example, a process can include sputtering of metallic material off of a solid metallic material target by impacting the target with high energy ions formed via plasma (e.g., argon, etc.).

Figure 11:
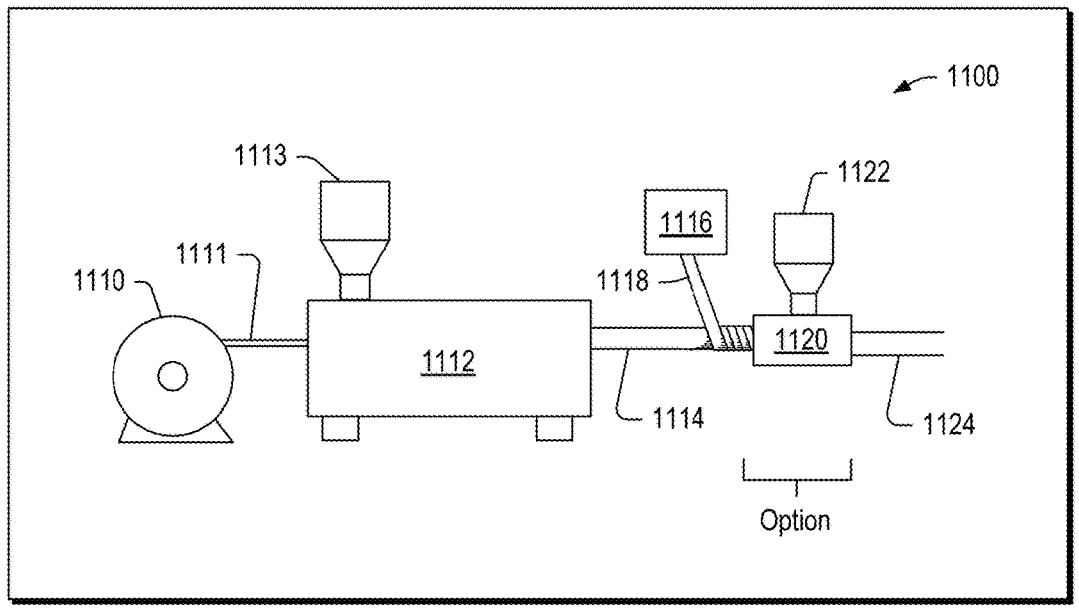
FIG. 11 illustrates examples of equipment.

FIG. 11 shows examples of equipment 1100 that include a reel 1110 that can supply a conductor 1111 to an extruder 1112 that includes a supply of polymeric material 1113 where the extruder 1112 can deposit the polymeric material 1113 as a polymeric material layer 1114 about the conductor 1111. As shown in the example of FIG. 11, metallic deposition equipment includes a supply of metallic material 1116 that can be deposited as a metallic layer 1118 about the polymeric material layer 1114. As an example, the metallic deposition equipment can perform a taping process where metallic film (e.g., optionally with adhesive) can be laid onto the polymeric material layer 1114, which may be laid helically, longitudinally, etc. In the example of FIG. 11, the processes can be in-line for continuous manufacturing.

As shown in the example of FIG. 11, an option can exist for implementing a metallizing process, for example, applying metalizing as in the example of FIG. 10 subsequent to a taping process where the metalizing can help to seal one or more spaces that may exist as to film (e.g., tape). For example, metallic deposition equipment 1120 can include a supply of metallic material 1122 that can be deposited as a metallic layer 1124 about the metallic layer 1118.

Figure 12:
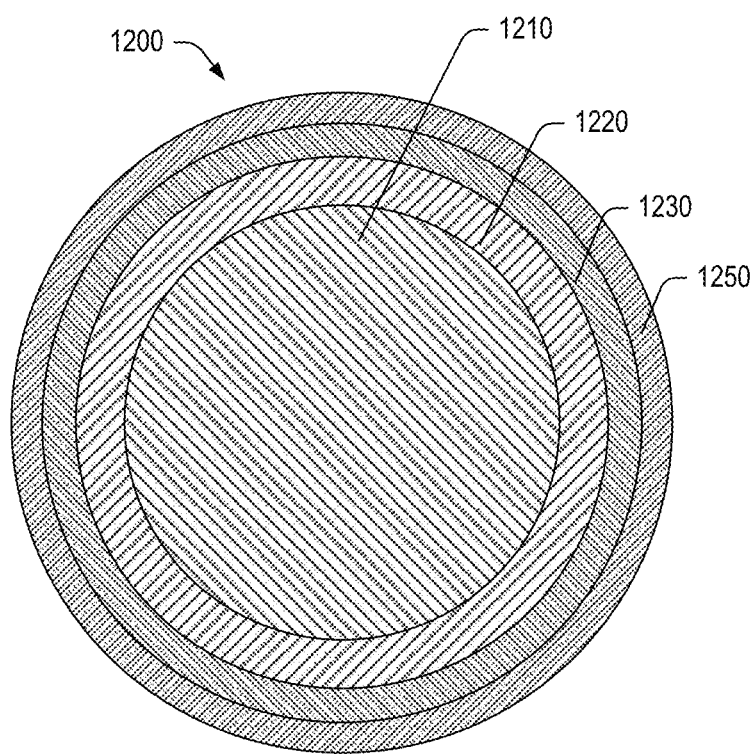
FIG. 12 illustrate an example of a coated conductor.

FIG. 12 shows an example of a cross-section of an insulated conductor 1200 that includes a conductor 1210, insulation 1220, an insulation barrier 1230 and polymer 1250, which can provide for water resistance and/or act as a gas barrier. In such an example, the insulation 1220 and the insulation barrier 1230 may be a metalized layer (see, e.g., the layer 840 of FIG. 8). As an example, the polymer 1250 can include IR heater activated filler. The insulated conductor 1200 of FIG. 12 can include polymeric material, metallic material and polymeric material such that the metallic material is disposed between polymeric materials.

Figure 13:
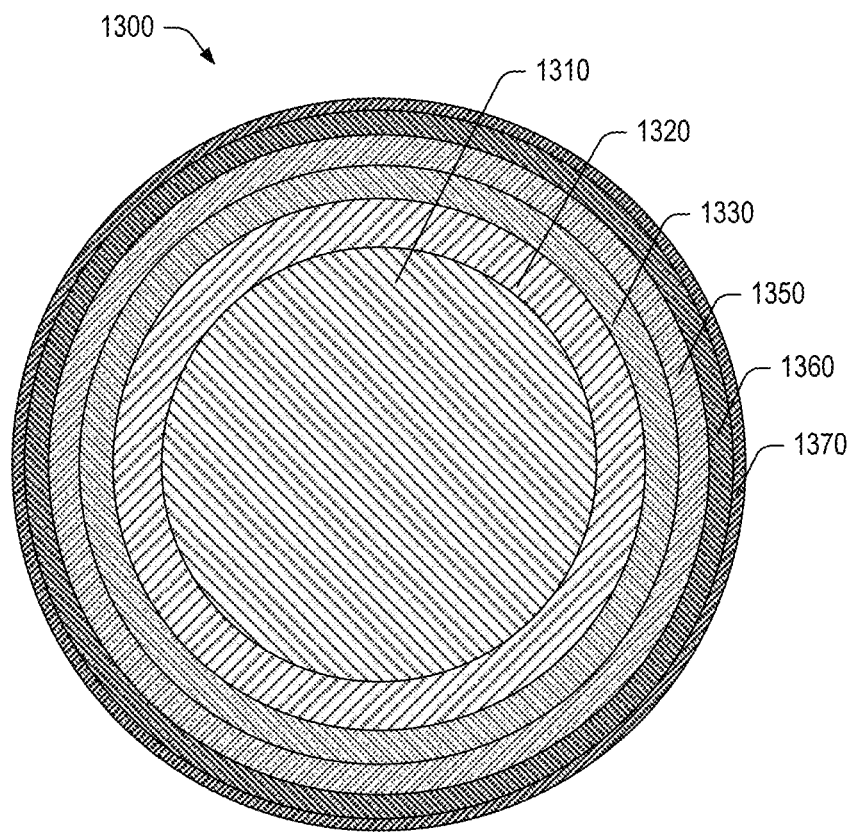
FIG. 13 illustrate an example of a coated conductor.

FIG. 13 shows an example of a cross-section of an insulated conductor 1300 that includes a conductor 1310, insulation 1320, an insulation barrier 1330, polymer 1350, a metallic material 1360 and polymer 1370. In such an example, the insulation 1320 and the insulation barrier 1330 may be a metalized layer and the polymer 1350 and the metallic material 1360 may be a metalized layer (see, e.g., the layer 840 of FIG. 8). The insulated conductor 1300 of FIG. 13 can include polymeric material, metallic material, polymeric material, metallic material and polymeric material such that two layers of metallic material are disposed between polymeric materials.

Figure 14:
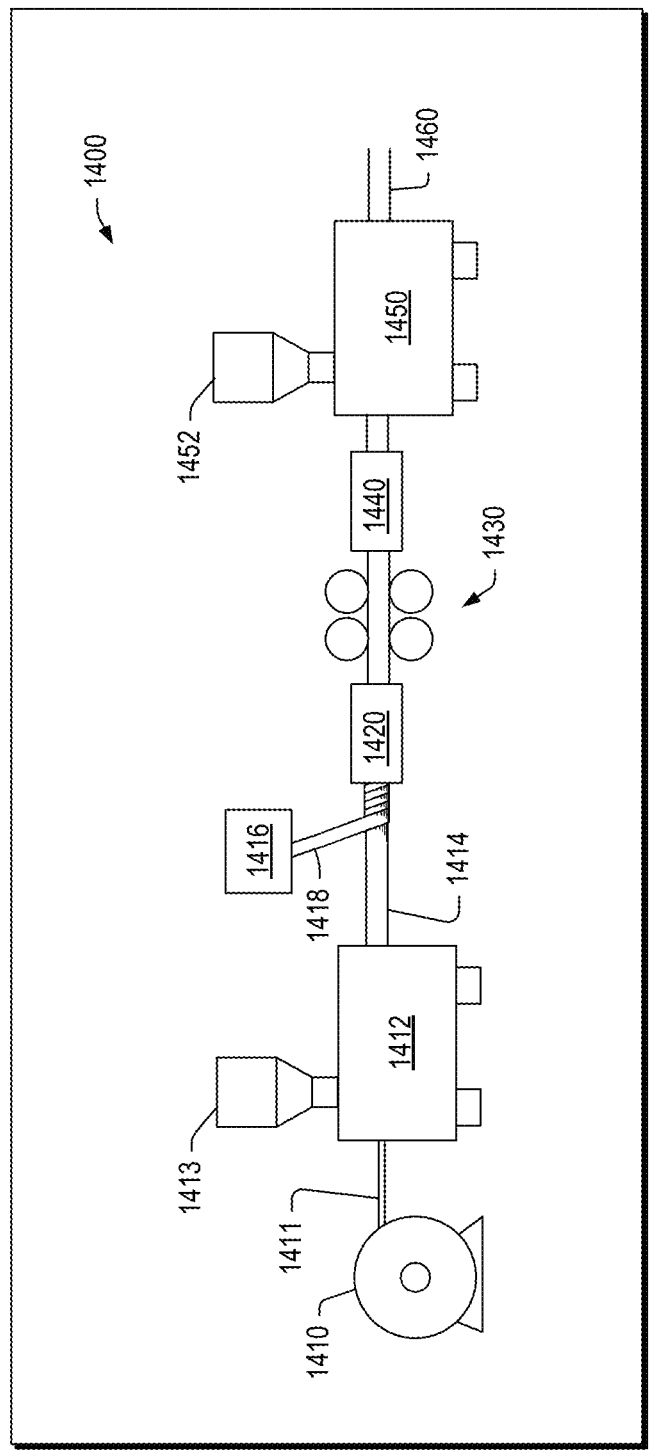
FIG. 14 illustrates examples of equipment.

FIG. 14 shows examples of equipment 1400 that can perform an extrusion, taping, rolling and extrusion process.

As shown the equipment 1400 can include a reel 1410 that can supply a conductor 1411 to an extruder 1412 that includes a supply of polymeric material 1413 where the extruder 1412 can deposit the polymeric material 1413 as a polymeric material layer 1414 about the conductor 1411. As shown in the example of FIG. 14, metallic deposition equipment includes a supply of metallic material 1416 that can be deposited as a metallic layer 1418 about the polymeric material layer 1414. As an example, the metallic deposition equipment can perform a taping process where metallic film (e.g., optionally with adhesive) can be laid onto the polymeric material layer 1414, which may be laid helically, longitudinally, etc. In the example of FIG. 14, a heater 1420 can heat at least the material 1418 and a roller 1430 can deform the material 1418, for example, to help to provide for appropriate coverage, sealing, etc. As shown, another heater 1440 may be included to further apply heat, which may help to smooth the material 1418 as emerging from the roller 1430. Such an approach may help to prepare the material 1418 for feed to an extruder 1450 that includes a supply of polymeric material 1452 that can be extruded about the material 1418 to form an extruded layer 1460. In the example of FIG. 14, the processes can be in-line for continuous manufacturing.

Figure 15:
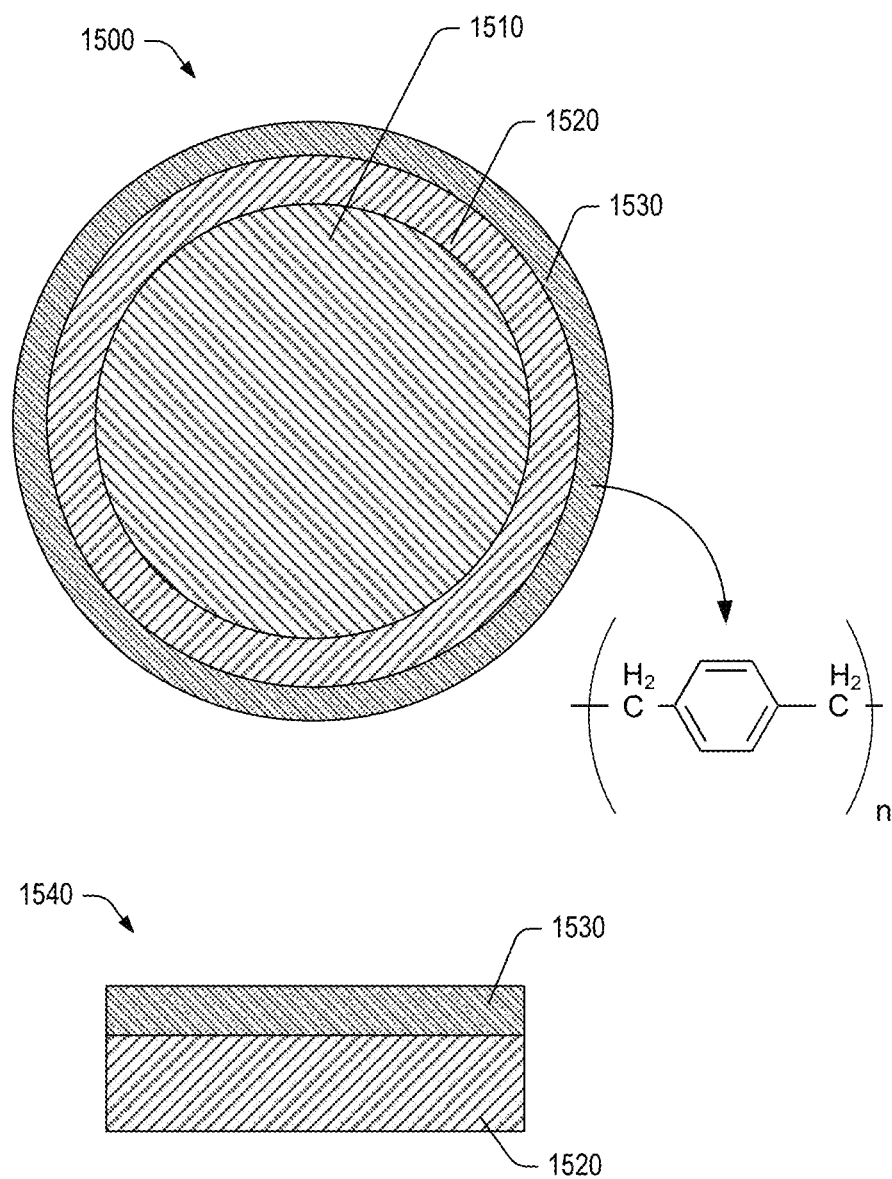
FIG. 15 illustrate an example of a coated conductor.

FIG. 15 shows an example of a coated conductor 1500 that includes a conductor 1510, barrier 1520 and an additional barrier 1530. In such an example, the barrier 1520 and the additional barrier 1530 may be applied separately or as the barrier 1520 with the additional barrier 1530 present, which is illustrated as a multi-polymeric material 1540.

In the example of FIG. 15, the additional barrier 1530 can include one or more types of poly(p-xylylene) polymer (e.g., "parylene" types of polymers, etc.), for example, as a coating on other polymeric material. In the example of FIG. 15, the coated conductor 1500 can include the barrier 1520 as a water resistant polymer and/or gas barrier polymer where the additional barrier 1530 is a parylene polymer coating.

As an example, a parylene polymer coating can be hydrophobic and provide chemical resistance with barrier properties against permeation of gas and/or water vapor. As an example, a method can include coating with a parylene polymer at ambient temperature; noting that a parylene polymer may be stable to oxidation up to a temperature of about 350 degrees C.

As an example, one or more parylene polymers may be chemical vapor deposited poly(p-xylylene) polymers that can form a moisture barrier and dielectric barrier. As an example, consider parylene C polymer. Parylene polymer may be provided to seal a surface against soil and/or oil, to resist abrasion, to add lubricity, etc., for example, without interfering with substrate elasticity or hardness while adding a relatively high dielectric value with minimal dimensional change. Various parylene polymers can resist hydrocarbons, corrosive gases and moisture. As an example, one or more parylene polymers may be included as a barrier to help protect another polymer layer from moisture and corrosive gases and, for example, to provide dielectric protection.

In the example of FIG. 15, the barrier 1520 can be water resistant and may include, for example, a polyaliphatic ketone, a fluoropolymer, a functionally modified fluoropolymer, a polyvinylidene fluoride (PVDF), a poly (arylene ether) polymer, etc. As an example, the additional barrier 1530 can be a parylene polymer such as, for example, parylene N, parylene C, parylene D, etc. In the example of FIG. 15, a chemical structure for parylene N polymer is shown, noting that one or more chlorines may be included as to the ring (e.g., one chlorine of parylene C, two chlorines of parylene D, etc.).

As an example, a method can include extruding a polymeric material over a conductor and then coating the polymeric material with one or more parylene polymers.

Figure 16:
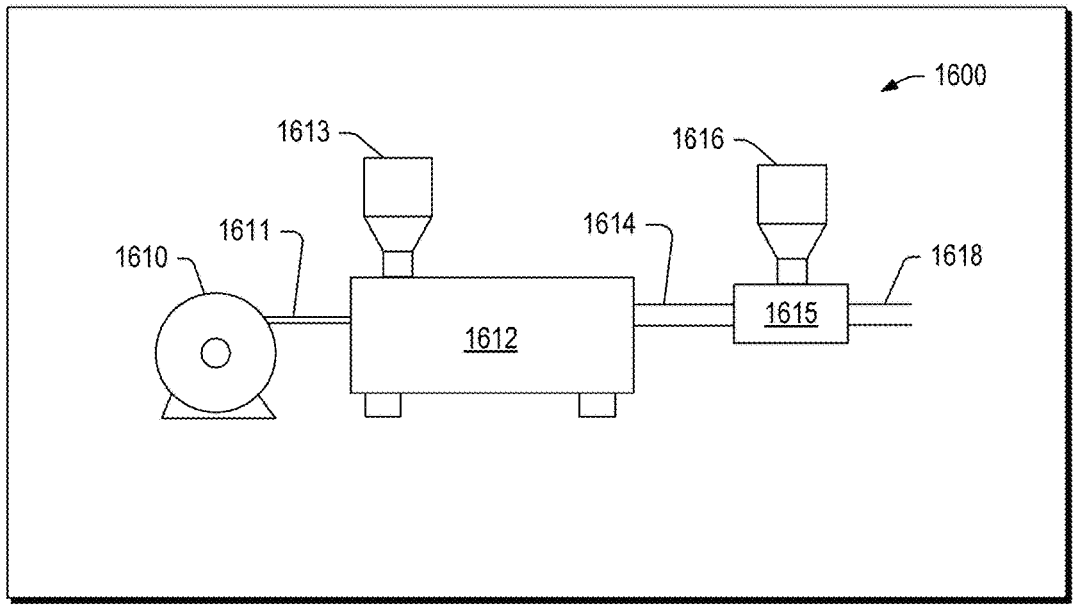
FIG. 16 illustrates examples of equipment.

FIG. 16 shows examples of equipment 1600 that include a reel 1610 that can supply a conductor 1611 to an extruder 1612 that includes a supply of polymeric material 1613 where the extruder 1612 can deposit the polymeric material 1613 as a polymeric material layer 1614 about the conductor 1611. As shown in the example of FIG. 16, polymeric deposition equipment 1615 includes a supply of polymeric material 1616 that can be deposited as a polymer layer 1618 about the polymeric material layer 1614. As an example, the polymeric deposition equipment 1615 can perform a process such as, for example, a spray process, a vapor deposition process, etc. In the example of FIG. 16, the processes can be in-line for continuous manufacturing.

Figure 17:
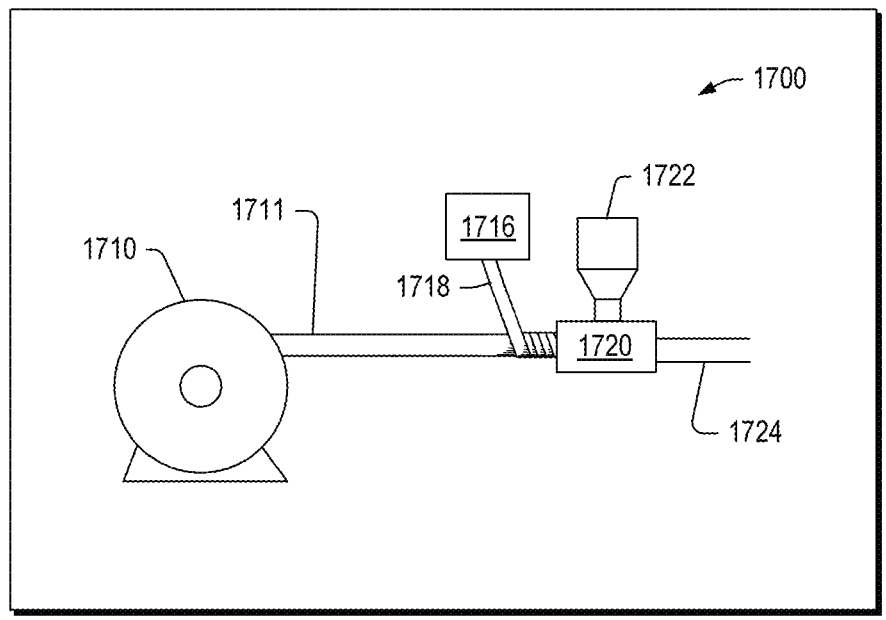
FIG. 17 illustrates examples of equipment.

FIG. 17 shows examples of equipment 1700 that include a reel 1710 that can supply a conductor 1711, taping equipment that includes a supply of tape 1716 that can be disposed about the conductor 1711 as a tape layer 1718, deposition equipment 1720 that includes a supply of polymeric material 1722 that can be deposited at least in part over the tape layer 1718 to form a polymeric material layer 1724. In the example of FIG. 17, the tape layer 1718 can be a water and/or gas barrier polymeric material and the polymeric material layer 1724 can include one or more types of parylene polymer.

Figure 18:
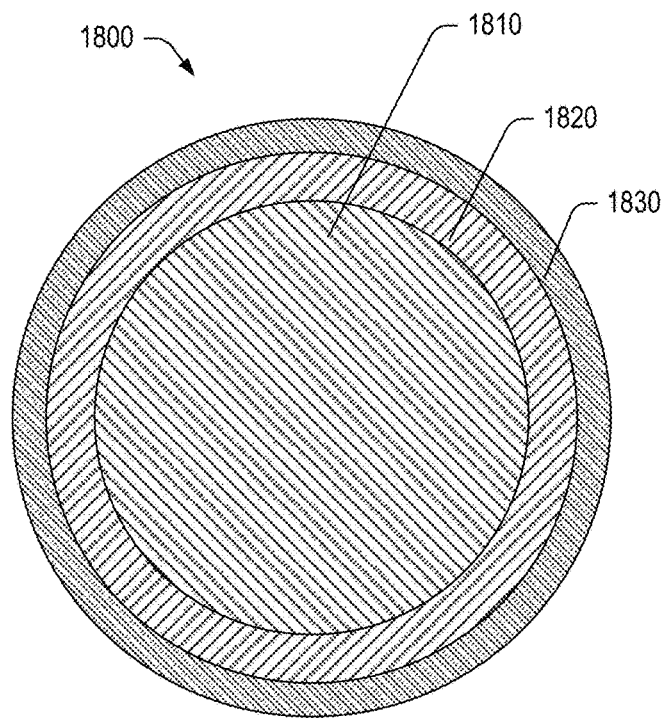
FIG. 18 illustrate an example of a coated conductor.
Figure 18:
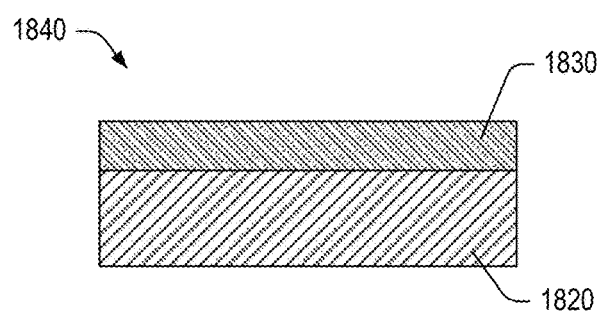

FIG. 18 shows an example of a coated conductor 1800 that includes a conductor 1810, barrier 1820 and an additional barrier 1830. In such an example, the barrier 1820 and the additional barrier 1830 may be applied separately or as the barrier 1820 with the additional barrier 1830 present, which is illustrated as a multi-layer material 1840. In the example of FIG. 18, the additional barrier 1830 can be a ceramic material, for example, as deposited via a sol-gel process.

As an example, a ceramic sol-gel process can be implemented at ambient temperature where reaction of metal-organic compounds with water can from oxide glasses or ceramics. As an example, one or more ceramic binders can be included, for example, as polymeric materials to provide flexibility, strength, etc.

As an example, a sol-gel process can be utilized to create a substantially solid material from relatively small molecules. As an example, a sol-gel process may be utilized to create a sol-gel barrier layer. As an example, a sol-gel layer can include one or more types of metal oxides, which may be, for example, a silicon based sol-gel. As an example, a process can include conversion of monomers into a colloidal solution (sol) that acts as a precursor for an integrated network (or gel) of discrete particles and/or network polymers. As an example, a precursor can be a metal alkoxide. As an example, a sol-gel layer, such as a sol-gel barrier layer, may be treated with a sealant that acts to seal the sol-gel layer. As an example, a polymeric tape can include a sol-gel material as a layer or layers.

Figure 19:
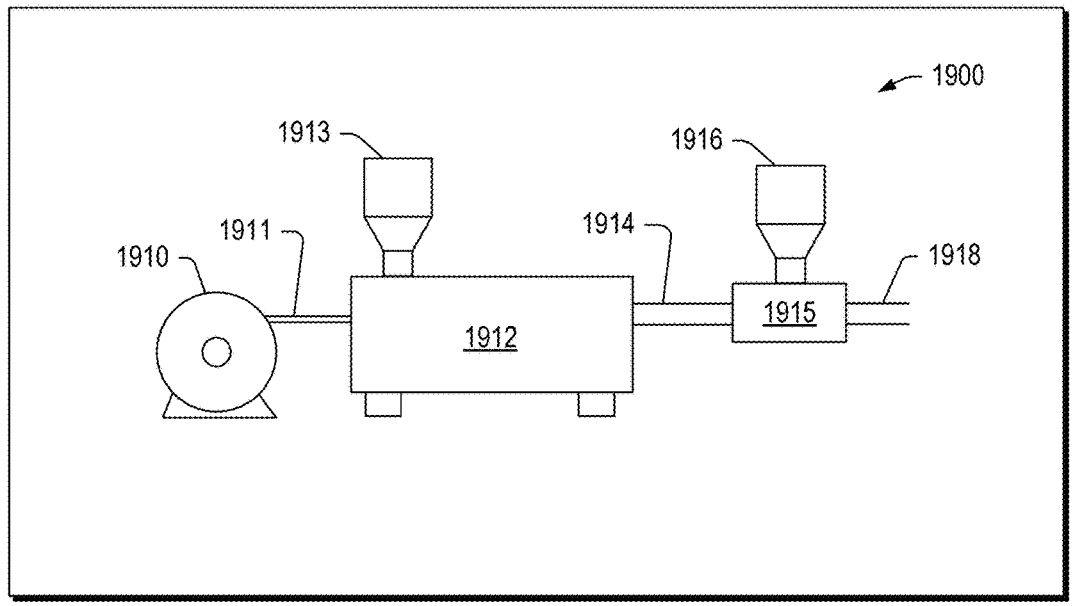
FIG. 19 illustrates examples of equipment.

FIG. 19 shows examples of equipment 1900 that include a reel 1910 that can supply a conductor 1911 to an extruder 1912 that includes a supply of polymeric material 1913 where the extruder 1912 can deposit the polymeric material 1913 as a polymeric material layer 1914 about the conductor 1911. As shown in the example of FIG. 19, sol-gel deposition equipment 1915 includes a supply of sol-gel material 1916 that can be deposited as a sol-gel layer 1918 about the polymeric material layer 1914. As an example, the sol-gel deposition equipment 1915 can perform a process such as, for example, a spray process, etc. In the example of FIG. 19, the processes can be in-line for continuous manufacturing.

Figure 20:
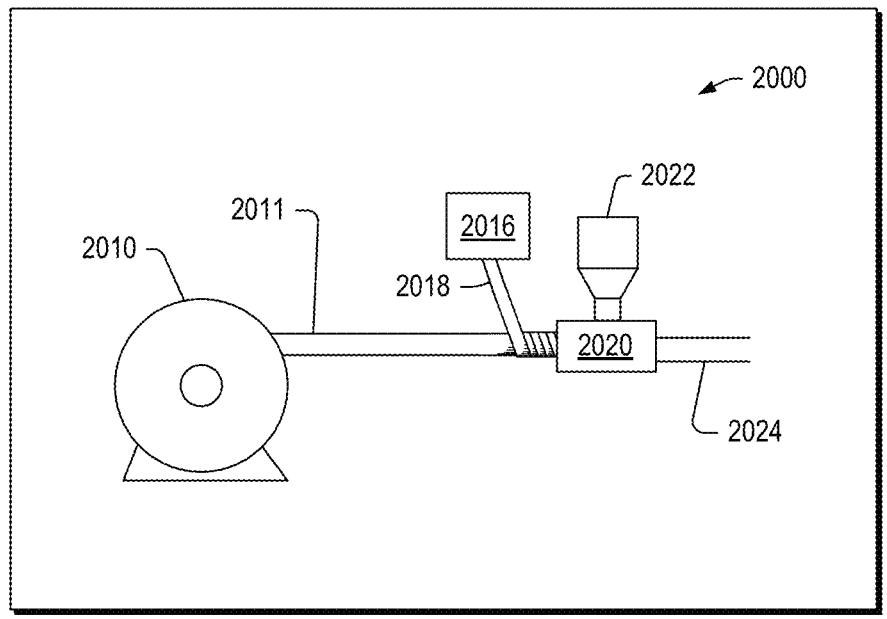
FIG. 20 illustrates examples of equipment.

FIG. 20 shows examples of equipment 2000 that include a reel 2010 that can supply a conductor 2011, taping equipment that includes a supply of tape 2016 that can be disposed about the conductor 2011 as a tape layer 2018, deposition equipment 2020 that includes a supply of sol-gel material 2022 that can be deposited at least in part over the tape layer 2018 to form a sol-gel material layer 2024 (e.g., ceramic, etc.). In the example of FIG. 20, the tape layer 2018 can be a water and/or gas barrier polymeric material and the sol-gel material layer 2024 can include one or more ceramic materials, optionally including one or more polymeric binders, etc.

Figure 21:
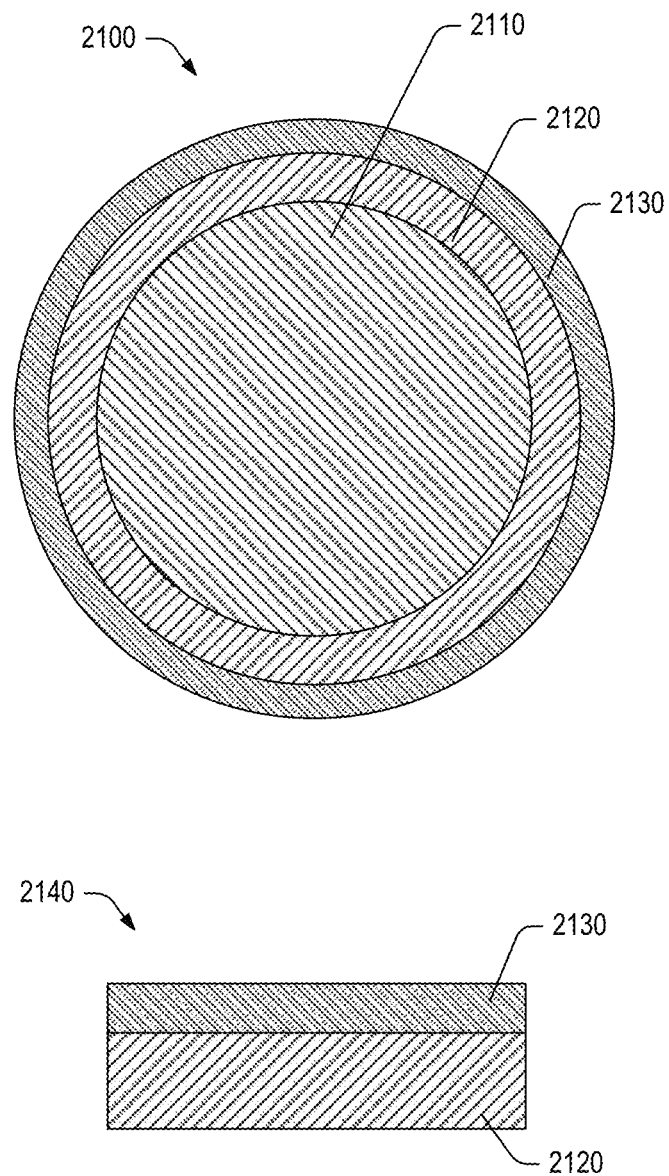
FIG. 21 illustrate an example of a coated conductor.

FIG. 21 shows an example of a coated conductor 2100 that includes a conductor 2110, barrier 2120 and an additional barrier 2130. In such an example, the barrier 2120 and the additional barrier 2130 may be applied separately or as the barrier 2120 with the additional barrier 2130 present, which is illustrated as a multi-layer material 2140. In the example of FIG. 21, the additional barrier 2130 can include one or more types of nano-materials.

As an example, a nano-material can be a nano particulate material that may provide properties for water scavenging, for example, consider aluminum-based nano particles, silicate nano particles, etc. As an example, a nano-material layer can be a polymeric composite layer where polymeric composite material includes one or more polymers and one or more types of nano particles. As an example, moisture scavenger nano particles may include organosiloxane such as, for example, one or more types of tetraalkylorthosilicate (e.g., tetramethylorthosilicates, tetraethylorthosilicates, etc.).

Figure 22:
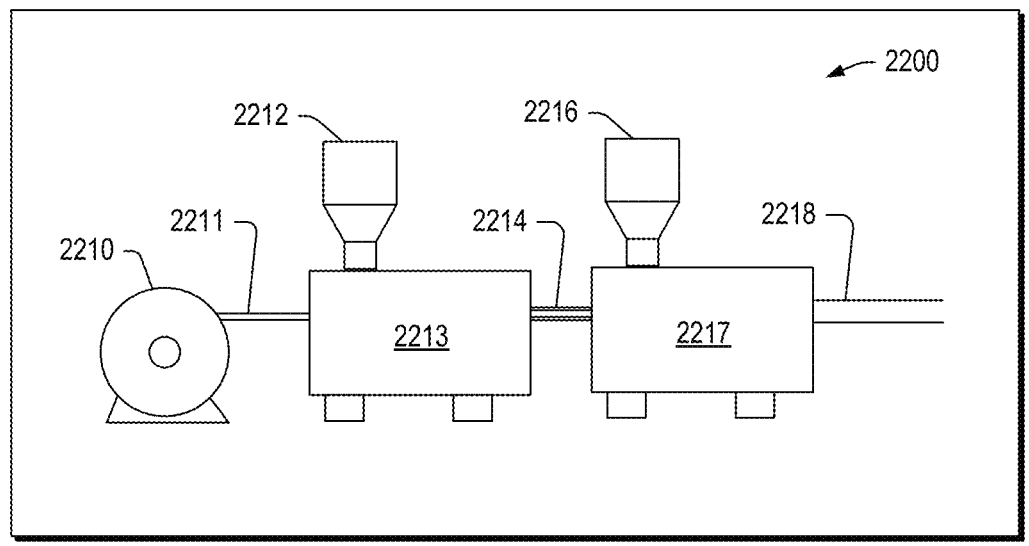
FIG. 22 illustrates examples of equipment.

FIG. 22 shows examples of equipment 2200 that include a reel 2210 that can supply a conductor 2211 to an extruder 2213 that includes a supply of polymeric material 2212 where the extruder 2213 can deposit the polymeric material 2212 as a polymeric material layer 2214 about the conductor 2211. As shown in the example of FIG. 22, nano particulate deposition equipment 2217 can be an extruder that includes a supply of nano particulate material 2216 that can be deposited as a nano particulate layer 2218 about the polymeric material layer 2214. In the example of FIG. 22, the processes can be in-line for continuous manufacturing.

Figure 23:
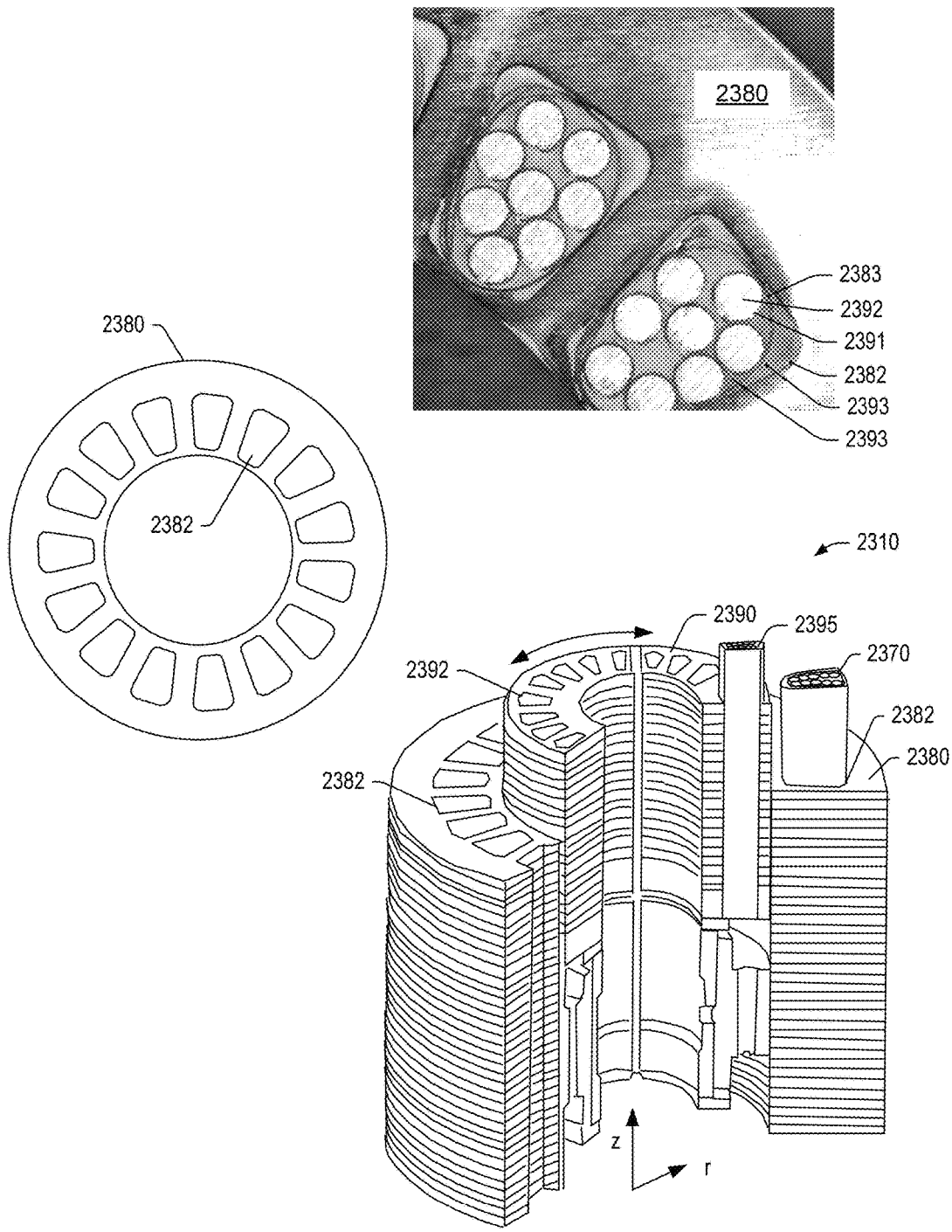
FIG. 23 illustrates examples of equipment.

FIG. 23 shows an example of a portion of an electric motor 2310 that can be implemented in a fluid environment, for example, as a submersible electric motor.

As shown in FIG. 23, the portion of the electric motor 2310 includes stator windings 2370 disposed at least in part in slots 2382 of stacked stator laminations 2380. The portion of the electric motor 2310 also includes rotor windings 2395 disposed at least in part in slots 2392 of stacked rotor laminations 2390.

FIG. 23 also shows a photograph of an example of a portion of an electric motor such as the electric motor 2310. In particular, the photograph shows a lamination that includes a slot 2382 where slot liner material 2383 defines an interior space such that the slot liner material 2383 surrounds magnet wire 2392 that can be coated with material 2391. As shown in the photograph, one or more types of material 2393 are disposed exteriorly and interiorly with respect to the slot liner material 2383.

As an example, an electric motor can include water-moisture resistant polymer insulation, which may be a composite material. Water resistant insulation material may be utilized to increase long term stability of insulation in wet environments. As an example, an electric motor can include insulation, varnish, conductors, liner material, hook-up wire tape, phase divider tape and lancing cord (see, e.g., the equipment 150 of FIG. 1). As an example, insulation and varnish may include one or more types of polyimide based materials which can be sensitive to aging in oil, particularly where moisture and/or gas is present and where temperatures may be relatively high (e.g., above about 150 degrees C.).

As an example, a water resistant polymer composite insulation can be applied for a downhole electrical motor such as, for example, an electrical submersible pump motor, where such insulation may aim to increase long term reliability.

As an example, a power cable can include a polymeric composite layer or layers. As an example, one or more electric motor components may include polymeric composite material or materials.

As an example, polymeric composite material may be utilized with one or more of magnet wire, brush wire, machined/molded parts, motor lead extensions (MLE), etc. As an example, equipment can include polyimide as a primary insulation where one or more barrier layers are included that can resist water and/or permeation of gas. As an example, such an approach may be utilized to reduce one or more cable dimensions to provide for a slimmer profile (e.g., for use in space constrained downhole applications). As an example, a dual-layer insulation system can include a primary layer of polyimide tape and a secondary layer of EPDM.

As an example, a water resistant polymer insulation composite material can be utilized to replace one or more types of polyimide materials where the water resistant polymer insulation composite material can be a high temperature rated material. Such a composite material can be utilized for equipment intended for long term deployment in sour gas environments (e.g., $H_2S$ environments).

As an example, cables, connectors, electric motor components, etc. may include a polymer composite material.

As an example, a telemetry cable and/or telemetry cable connectors can include a polymeric composite material. Such a cable and/or connectors may be suitable for one or more types of downhole applications.

As an example, a water resistant polymer composite material can include one or more of a polyaliphatic ketone polymer, a fluoropolymer, a functionally modified fluoropolymer, a polyvinylidene fluoride (PVDF) polymer, and a poly (arylene ether) polymer.

As an example, a polymer composite insulation material can possess one or several metallized layers that can help to protect against intrusion of water and/or gas, for example, as may be present in downhole environments. As an example, one or more metal components can include one or more of aluminum, ferrous, nickel, etc. As an example, one or more components can include a metal and/or alloy that are relatively resistant to downhole conditions.

As an example, a manufacturing method can include one or more of a high-velocity powder spray process (e.g., cold spray), a deposition chamber process (e.g., akin to package coating), etc.

As an example, a metallization process may be implemented as part of a method that includes, for example, an extrusion process. As an example, a metallization process can be a taping process or another type of metallization process (e.g., deposition via vapor, spray, etc.). As an example, a method can include taping, heat-rolling, and extrusion. As an example, a metalized polymer composite material can be a multi-layer composite material.

As an example, a coated electrical conductor can include a barrier layer that includes poly(p-xylylene). In such an example, the barrier layer can provide water resistance to an underlying polymeric insulation layer. As an example, a layer that includes poly(p-xylylene) may be applied via a tandem process using co-extrusion or, for example, in a sequential process, optionally using extrusion and/or another type of deposition technique. As an example, poly(p-xylylene) may be applied on to a polymer insulation layer via taping (e.g., consider a poly(p-xylylene) tape).

As an example, a water/moisture resistance polymeric composite insulation can include a ceramic coating deposited via a sol-gel process, optionally to form the ceramic coating as an outer most layer. As an example, a ceramic layer can be created by a mixture of metal-organic compounds and water. In such an example, a ceramic coating process may be applied on to a water resistant polymer layer, taped polymer insulation layer, etc.

As an example, a coated electrical conductor can include one or more nano-scale water scavenger particle reinforced layers where, for example, such nano-scale particles can be or include one or more of organosiloxan, tetramethylorthosilicate and tetraethylorthosilicate.

As an example, a water/moisture resistance composite polymer insulation structure may be applied to a jacket layer. In such an example, the resulting coated conductor may be utilized as a downhole power and telemetry cable where the coating aims to protect against water/moisture, gas migration from downhole environment, etc.

As an example, a continuous barrier can be utilized to mitigate gas migration into one or more of insulation wires, cables, motor conductors, downhole tools, including optic fibers (e.g. geothermal), etc.

As an example, an assembly can include a housing that includes opposing ends, a longitudinal axis, an axial length defined between the opposing ends, a maximum transverse dimension that is less than the length and an interior space; circuitry disposed at least in part in the interior space; and a coated electrical conductor electrically coupled to the circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer. In such an example, the length of the electrical conductor can be an unbent or uncurved length, for example, a substantially straight length where, in an assembly, the electrical conductor may be wound, bent, curved, etc. As an example, in such an assembly, circuitry can include sensor circuitry of a sensor operatively coupled to the housing and/or include electric motor circuitry of an electric motor operatively coupled to the housing.

As an example, a coated electrical conductor can be a magnet wire that forms part of an electrical-mechanical component that can be part of an assembly and, for example, disposed at least in part in an interior space of a housing.

As an example, a barrier layer can be a metallic barrier layer. For example, consider a metallic barrier layer that includes nickel (e.g., optionally as an alloy, etc.). In such an example, the nickel may be part of an alloy that has a relatively low permeability to hydrogen (e.g., less than about $10^{-10}$ mols $H_2/m \cdot s \cdot Pa^{0.5}$). As an example, a barrier layer can include poly(p-xylylene). As an example, a barrier layer may act as a gas and/or water barrier for a polymeric electrical insulation layer. In such an example, the polymeric electrical insulation layer can include polyimide.

As an example, a barrier layer can be of a thickness greater than approximately 10 microns and less than approximately 50 microns.

As an example, an electrical conductor can be of a diameter greater than 28 AWG and less than 1 AWG.

As an example, a barrier layer can be a sol-gel layer, for example, a layer deposited via a sol-gel process.

As an example, a barrier layer can be a tape layer, optionally treated via one or more of pressure and heat. As an example, a material may be deposited over a tape layer, for example, to smooth tape the presence of overlaps, gaps, etc. As an example, heat and pressure may be applied to a tape layer to smooth the tape and, for example, to help assure sealing as to overlap and/or other regions of the tape.

As an example, a barrier layer can be a vapor deposited barrier layer. For example, a material may be deposited to an electrical insulation layer via a deposition process. Such a process can include vaporizing material and contacting the electrical insulation layer with the vapor whereby vaporized material is deposited onto the electrical insulation layer. In such an example, process parameters may be controlled to achieve a desired thickness of a vapor deposited barrier layer. As an example, a vapor deposition process may optionally be performed in a continuous manner or, for example, in stages. As an example, in a staged approach, a time may be provided for drying, etc., of a vapor deposited layer prior to further vapor deposition of the same and/or different material.

As an example, a scavenger material may be disposed in at least one layer of a coated electrical conductor where the scavenger material includes a water scavenger material, a $H_2S$ scavenger material or a water scavenger material and a $H_2S$ scavenger material. As an example, a scavenger material can include aluminum, lead (Pb), molybdenum or a combination of two or more of aluminum, lead (Pb) and molybdenum. As an example, a scavenger material may be capable of forming oxides, for example, metal oxides (e.g., consider one or more aluminum oxides). As an example, a scavenger material may effect pH locally when exposed to water and/or $H_2S$.

As an example, a method can include depositing a polymeric electrical insulation layer about a length of an electrical conductor that includes copper; depositing a barrier layer about at least a portion of the polymeric electrical insulation layer to form at least a portion of a coated electrical conductor; and forming a submersible component that includes at least a portion of the coated electrical conductor. In such an example, the barrier layer can be a metallic barrier layer and/or a poly(p-xylylene) barrier layer. As an example, depositing of a barrier layer can include taping and/or extruding and/or vapor deposition (e.g., depositing material from a vapor).

As an example, a barrier layer can include poly(p-xylylene) and can include chlorine, for example, as bound to the poly(p-xylylene).

As an example, a vapor deposited barrier layer can be a metallic vapor deposited barrier layer or a polymeric vapor deposited barrier layer or a combination of both metallic and polymeric vapor deposited.

As an example, a coated conductor can include nano particles, for example, nano particles can be or include scavenger material.

As an example, a method can include depositing a polymeric layer via taping and/or via extruding. In such an example, the method can include depositing a barrier layer via taping, extruding and/or vapor deposition. As an example, a method can include heating a barrier layer. As an example, a method can include depositing a layer of material about at least a portion of a barrier layer, which may include extruding a layer of material about at least a portion of a barrier layer.

As an example, a method can include depositing a polymeric electrical insulation layer about a length of an electrical conductor that includes copper; depositing a barrier layer about at least a portion of the polymeric electrical insulation layer to form at least a portion of a coated electrical conductor; and forming a submersible component that includes at least a portion of the coated electrical conductor where such a submersible component can be a stator of an electric motor or, for example, a power cable and/or an information transmission cable.

As an example, a submersible component can be a wireline cable (e.g., for power and/or telemetry) for one or more types of downhole logging tools. As an example, a submersible component can be a completion component, which may be part of a permanent downhole assembly, a temporary downhole assembly, etc. (e.g., retrievable via a wireline, etc.).

As an example, a method can include one or more processes as described with respect to examples of equipment in FIGS. 10, 11, 14, 16, 17, 19, 20 and 22. As an example, a coated conductor can include one or more layers as described with respect to examples of coated conductors of FIGS. 8, 12, 13, 15, 18, and 21.

As an example, one or more methods described herein may include associated computer-readable storage media (CRM) blocks. Such blocks can include instructions suitable for execution by one or more processors (or cores) to instruct a computing device or system to perform one or more actions.

According to an embodiment, one or more computer-readable media may include computer-executable instructions to instruct a computing system to output information for controlling a process. For example, such instructions may provide for output to sensing process, an injection process, drilling process, an extraction process, an extrusion process, a deposition process, a pumping process, a heating process, etc.

Figure 24:
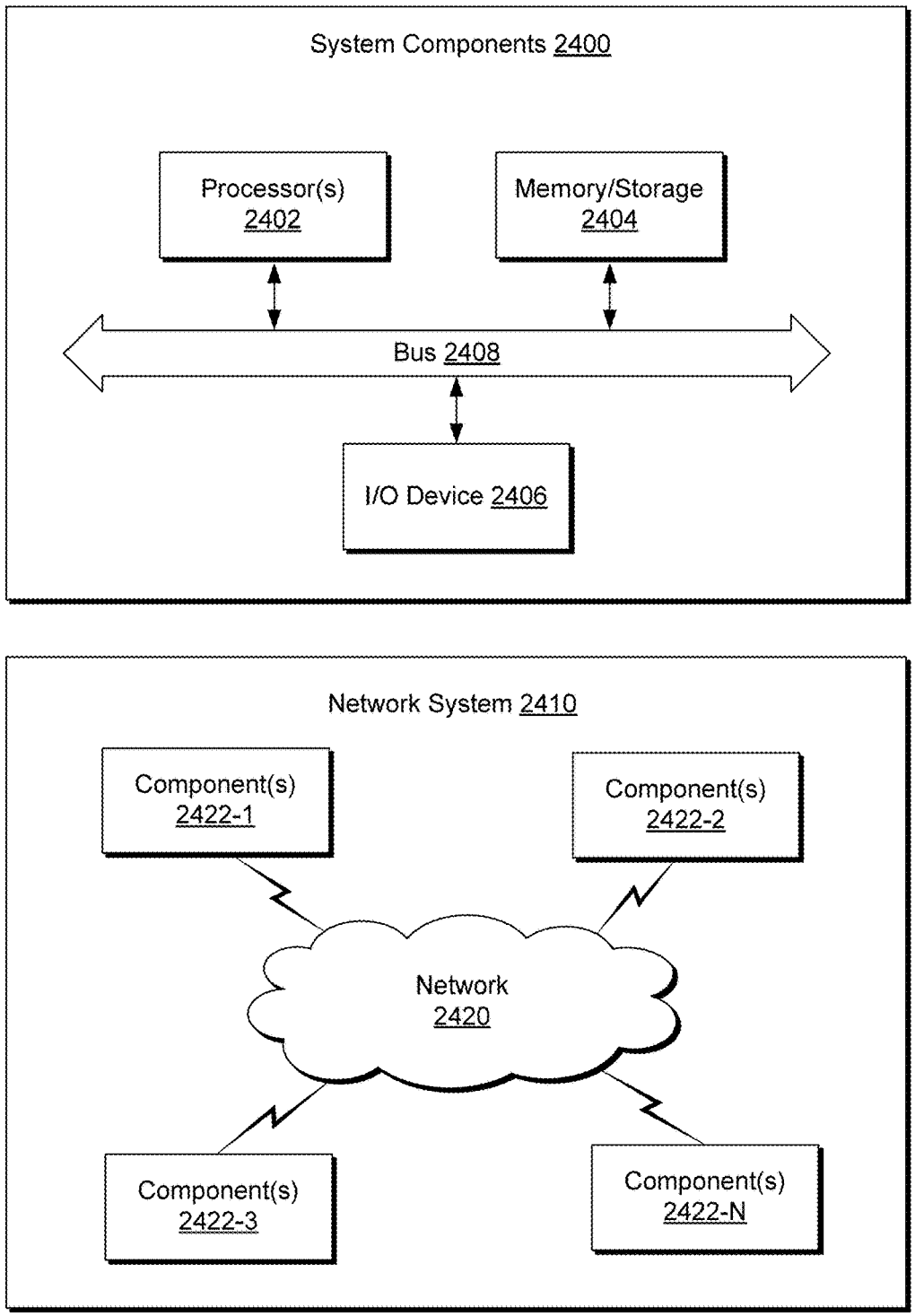
FIG. 24 illustrates example components of a system and a networked system.

FIG. 24 shows components of a computing system 2400 and a networked system 2410. The system 2400 includes one or more processors 2402, memory and/or storage components 2404, one or more input and/or output devices 2406 and a bus 2408. According to an embodiment, instructions may be stored in one or more computer-readable media (e.g., memory/storage components 2404). Such instructions may be read by one or more processors (e.g., the processor(s) 2402) via a communication bus (e.g., the bus 2408), which may be wired or wireless. The one or more processors may execute such instructions to implement (wholly or in part) one or more attributes (e.g., as part of a method). A user may view output from and interact with a process via an I/O device (e.g., the device 2406). According to an embodiment, a computer-readable medium may be a storage component such as a physical memory storage device, for example, a chip, a chip on a package, a memory card, etc.

According to an embodiment, components may be distributed, such as in the network system 2410. The network system 2410 includes components 2422-1, 2422-2, 2422-3, . . ., 2422-N. For example, the components 2422-1 may include the processor(s) 2402 while the component(s) 2422-3 may include memory accessible by the processor(s) 2402. Further, the component(s) 2422-2 may include an I/O device for display and optionally interaction with a method. The network may be or include the Internet, an intranet, a cellular network, a satellite network, etc.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. An assembly comprising:
a housing that comprises opposing ends, a longitudinal axis, an axial length defined between the opposing ends, a maximum transverse dimension that is less than the length and an interior space;
circuitry disposed at least in part in the interior space; and
a coated electrical conductor electrically coupled to the circuitry wherein the coated electrical conductor comprises an electrical conductor that comprises copper and a length defined by opposing ends, a polymeric electrical insulation layer disposed about at least a portion of the length of the electrical conductor, and a barrier layer disposed about at least a portion of the polymeric electrical insulation layer,
wherein the barrier layer comprises a sol-gel layer.

2. The assembly of claim 1 wherein the circuitry comprises sensor circuitry of a sensor operatively coupled to the housing.

3. The assembly of claim 1 wherein the circuitry comprises electric motor circuitry of an electric motor operatively coupled to the housing.

4. The assembly of claim 1 wherein the coated electrical conductor is a magnet wire that forms part of an electrical-mechanical component.

5. The assembly of claim 1 wherein the barrier layer comprises a metallic barrier layer.

6. The assembly of claim 5 wherein the metallic barrier layer comprises nickel.

7. The assembly of claim 1 wherein the barrier layer comprises poly(p-xylylene).

8. The assembly of claim 1 wherein the polymeric electrical insulation layer comprises polyimide.

9. The assembly of claim 1 wherein the barrier layer comprises a thickness greater than approximately 10 microns and less than approximately 50 microns.

10. The assembly of claim 1 wherein the electrical conductor comprises a diameter greater than 28 AWG and less than 1 AWG.

11. The assembly of claim 1 wherein the barrier layer comprises tape.

12. The assembly of claim 1 wherein the barrier layer comprises vapor deposited barrier layer.

13. An assembly comprising:
a housing that comprises opposing ends, a longitudinal axis, an axial length defined between the opposing ends, a maximum transverse dimension that is less than the length and an interior space;
circuitry disposed at least in part in the interior space;
a coated electrical conductor electrically coupled to the circuitry wherein the coated electrical conductor comprises an electrical conductor that comprises copper and a length defined by opposing ends, a polymeric electrical insulation layer disposed about at least a portion of the length of the electrical conductor, and a barrier layer disposed about at least a portion of the polymeric electrical insulation layer; and
a scavenger material disposed in at least one layer of the coated electrical conductor wherein the scavenger material comprises a water scavenger material, a $H_2S$ scavenger material or a water scavenger material and a $H_2S$ scavenger material.

14. The assembly of claim 13 wherein the scavenger material comprises aluminum, lead (Pb), molybdenum or a combination of two or more of aluminum, lead (Pb) and molybdenum.

* * * * *